US012507024B2

(12) United States Patent
Mehrabi et al.

(10) Patent No.: US 12,507,024 B2
(45) Date of Patent: Dec. 23, 2025

(54) CALIBRATION OF AUDIO PLAYBACK DEVICES

(71) Applicant: Sonos, Inc., Santa Barbara, CA (US)

(72) Inventors: Adib Mehrabi, London (GB); Patrick Kevin McPherson, Somerville, MA (US); Wenyu Jin, Eden Prairie, MN (US); Christopher Pike, Manchester (GB)

(73) Assignee: Sonos, Inc., Goleta, CA (US)

( * ) Notice: Subject to any disclaimer, the term of this patent is extended or adjusted under 35 U.S.C. 154(b) by 212 days.

(21) Appl. No.: 18/458,742

(22) Filed: Aug. 30, 2023

(65) Prior Publication Data

US 2024/0080637 A1 Mar. 7, 2024

Related U.S. Application Data

(60) Provisional application No. 63/374,310, filed on Sep. 1, 2022, provisional application No. 63/374,323, filed on Sep. 1, 2022.

(51) Int. Cl.

| | |
|---|---|
| ***H04S 7/00*** | (2006.01) |
| ***H04R 1/02*** | (2006.01) |
| ***H04R 1/04*** | (2006.01) |

(52) U.S. Cl.

CPC ............. *H04S 7/301* (2013.01); *H04R 1/025* (2013.01); *H04R 1/04* (2013.01); *H04S 2400/01* (2013.01); *H04S 2400/15* (2013.01)

(58) Field of Classification Search

CPC ........ H04R 29/001; H04R 1/04; H04R 1/025; H04R 29/002; H04S 7/301; H04S 2400/15; H04S 2400/01; H04S 7/00

USPC ............................................. 381/58–59, 103

See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |

(Continued)

FOREIGN PATENT DOCUMENTS

| | | | |
|---|---|---|---|
| EP | 1389853 | A1 | 2/2004 |
| WO | 200153994 | | 7/2001 |
| WO | 2003093950 | A2 | 11/2003 |

OTHER PUBLICATIONS

AudioTron Quick Start Guide, Version 1.0, Mar. 2001, 24 pages.

(Continued)

*Primary Examiner* — Disler Paul

(74) *Attorney, Agent, or Firm* — Fortem IP LLP

(57) ABSTRACT

Example techniques relate to audio playback device calibration. Example playback devices described herein may utilize one or more techniques for calibration, which may be implemented as various calibration procedures. In some implementations, the example media playback system may support multiple types of calibration, perhaps with different calibration procedures being used for different types of playback devices (e.g., with different capabilities) or in different situations (e.g., with or without user involvement).

20 Claims, 20 Drawing Sheets

(56) References Cited

U.S. PATENT DOCUMENTS

| | | | | |
|---|---|---|---|---|
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 9,426,598 | B2 * | 8/2016 | Walsh | H04S 7/301 |
| 9,560,460 | B2 * | 1/2017 | Chaikin | H04R 29/001 |
| 9,913,056 | B2 * | 3/2018 | Master | H04R 1/08 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2007/0217619 | A1 * | 9/2007 | Hall | H03G 5/025<br>381/59 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *D&M Holdings* (No. 14-1330-RGA), DI 219, Claim Construction Opinion (Jan. 12, 2017) (24 pages).

U.S. Appl. No. 60/490,768, filed Jul. 28, 2003, entitled "Method for synchronizing audio playback between multiple networked devices," 13 pages.

U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

CALIBRATION OF AUDIO PLAYBACK DEVICES

CROSS REFERENCE TO RELATED APPLICATIONS

This application claims the benefit of priority to U.S. Patent Application No. 63/374,310, filed Sep. 1, 2022, and to U.S. Patent Application No. 63/374,323, filed Sep. 1, 2022, each of which is incorporated herein by reference in its entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
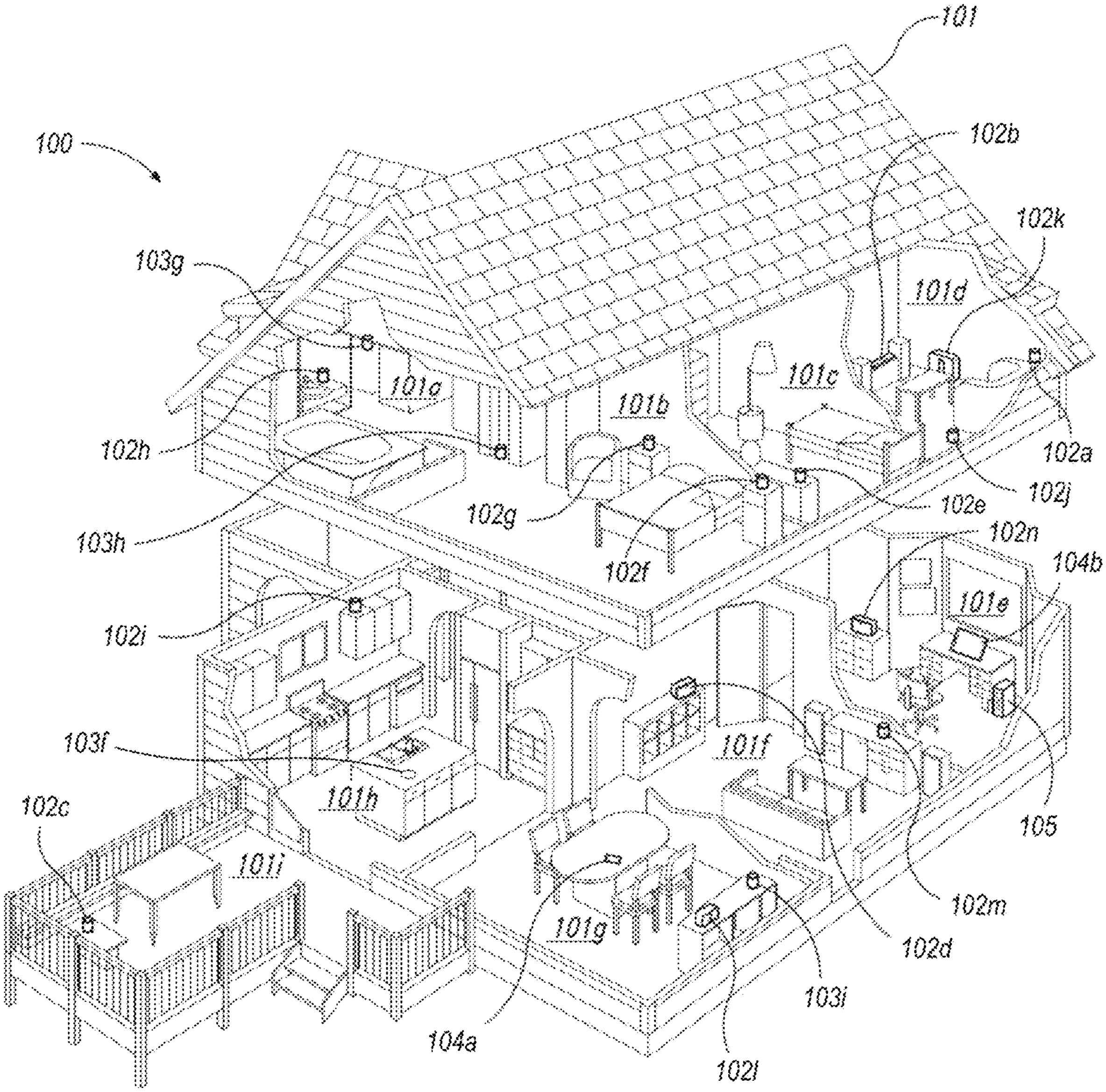
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

DETAILED DESCRIPTION

I. Overview

Examples described herein relate to calibration of audio playback devices in a media playback system. Example playback devices described herein may utilize one or more techniques for calibration, which may be implemented as various calibration procedures. In some implementations, the example media playback system may support multiple types of calibration, perhaps with different calibration procedures being used for different types of playback devices (e.g., with different capabilities) or in different situations (e.g., with or without user involvement).

One type of calibration procedure may involve a playback device playing back a calibration sound. While the playback device is playing back the calibration sound, a microphone captures output of playback device during playback of the calibration sound via one or more microphones moving through the listening area, such as the microphone(s) on a smartphone or tablet. This captured output is used to calculate a spectral correction which is intended to at least partially offset acoustic characteristics of the listening area when applied to the playback device. This type of calibration procedure may be referred to as a manual spectral calibration, as it involves a user physically moving a microphone through the listening area, which may be referred to as a "room dance." Additional details regarding manual spectral calibration can be found, for example, in U.S. Pat. No. 9,706,323, titled "Playback Device Calibration," which is incorporated by reference in its entirety.

In some example playback devices, two or more playback devices may be bonded together to form a bonded configuration, such as a stereo pair or home theatre configuration. In such configurations, the manual spectral calibration may be supplemented by a manual spatial calibration. The manual spatial calibration may involve the user positioning the microphone in a listening position. Based on output from the playback devices in the bonded configuration, arrival times from the playback devices (and/or channels) in the bonded configuration are measured and a spectral calibration including delay and/or gain corrections is determined to offset differences in arrival time and/or amplification. Additional details regarding spectral calibration can be found, for example, in U.S. Pat. No. 9,860,670, titled "Spectral Correction Using Spatial Calibration," which is incorporated by reference in its entirety".

Some example playback devices may utilize a self-calibration process. In such procedures, a playback device captures its own playback using its own microphones and then determines a self-impulse response. The playback device may then determine a spectral correction based on a machine learning algorithm that has been trained on a large number of manual spectral calibration iterations in different listening areas. Such self-calibration processes might not as consistently produce as accurate of a calibration as manual calibration procedures, but may be more convenient since such procedures do not necessarily involve a user. As such, portable playback devices (which are typically more frequency re-positioned or re-oriented relative to wall-powered playback devices) may utilize such a self-calibration procedure to facilitate re-calibration (e.g., periodically or when the portable playback device is moved). Additional details regarding self-calibration can be found, for example, in U.S. Pat. No. 9,763,018, titled "Calibration of Audio Playback Devices," U.S. Pat. No. 10,299,061, titled "Playback Device Calibration," and U.S. Pat. No. 10,734,965, titled "Audio Calibration of a Portable Playback Device," which are each incorporated by reference in their entirety.

Some example calibration procedures may utilize both manual and self-calibration aspects. For instance, an example calibration procedure may use self-calibration for spectral calibration and manual calibration for spatial calibration. Playback devices in a bonded zone may self-calibrate themselves spectrally, and then undergo manual calibration to calibrate to one or more particular listening locations.

The above-described self-calibration procedures may be utilized with microphone-enabled playback devices, however, some playback devices might not be equipped with a microphone. In such cases, a player-to-player calibration procedure may in some cases be used to calibrate one or more non-microphone-enabled playback devices with one or more microphone-enabled playback devices. For instance, a bonded configuration that includes a non-microphone-enabled soundbar can be calibrated using one or more microphone-enabled surrounds (or vice-versa). In player-to-player calibration, the non-microphone-enabled playback device(s) plays back a calibration sound while the microphone-enabled playback device(s) capture output of the non-microphone-enabled playback device(s) via their microphone(s). This captured output is used to calculate a spectral correction. The microphone-enabled playback device(s) may calibrate themselves (e.g., before calibrating the non-microphone-enabled playback device(s)) using the above-described self-calibration procedures.

As noted above, example media playback devices may support using two or more calibration procedures (e.g., any of the above-described calibration procedures) to calibrate. Different calibration procedures may be utilized in different situations or configurations. For instance, a playback device may initially self-calibrate using one of the self-calibration procedures. After a manual calibration is performed, the playback device may instead use the calibration from the manual calibration. If the manual calibration is no longer reliable (e.g., because the playback device(s) were re-positioned or re-orientated, or the environment changed), the playback device may trigger re-calibration (e.g., using one of the self or player-to-player calibration techniques).

As noted above, example techniques relate to calibration of playback devices. An example implementation involves a system comprising a first playback device and a second playback device. The first playback device comprises a microphone and is configured to: apply a first calibration that at least partially corrects, or "offsets," acoustic characteristics (e.g., undesirable acoustic characteristics) of an environment surrounding the first playback device when applied to the first playback device; form a bonded configuration with the second playback device; while in the bonded configuration, capture, via the microphone, first audio played back by the second playback device; determine a second calibration that at least partially offsets acoustic characteristics of an environment surrounding the second playback device as represented in the captured first audio when applied to the second playback device; cause, via the first network interface, the second playback device to apply the determined second calibration; and while the first calibration is applied to the first playback device, the second calibration is applied to the second playback device, and the first playback device is in the bonded configuration with the second playback device, play back one or more first channels of second audio in synchrony with playback of one or more second channels of the second audio by the second playback device. The second playback device excludes a microphone and is configured to play back the first audio; and while the first calibration is applied to the first playback device, the second calibration is applied to the second playback device, and the second playback device is in the bonded configuration with the first playback device, play back the one or more second channels of the second audio in synchrony with playback of one or more first channels of the second audio by the first playback device.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
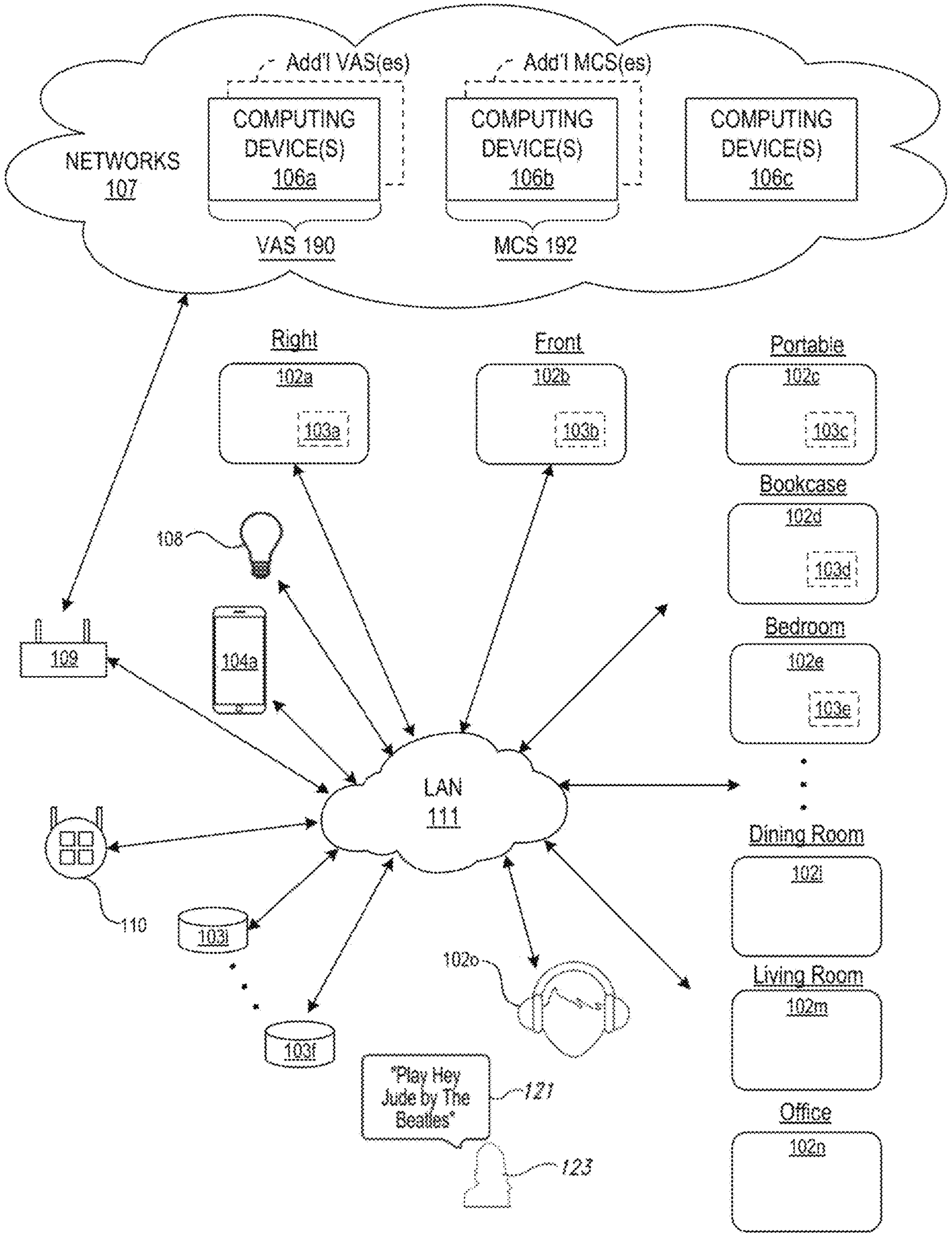
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A).

In embodiments described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related embodiment, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a*—e include or are otherwise equipped with corresponding NMDs 103*a*—e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 1021, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106—d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
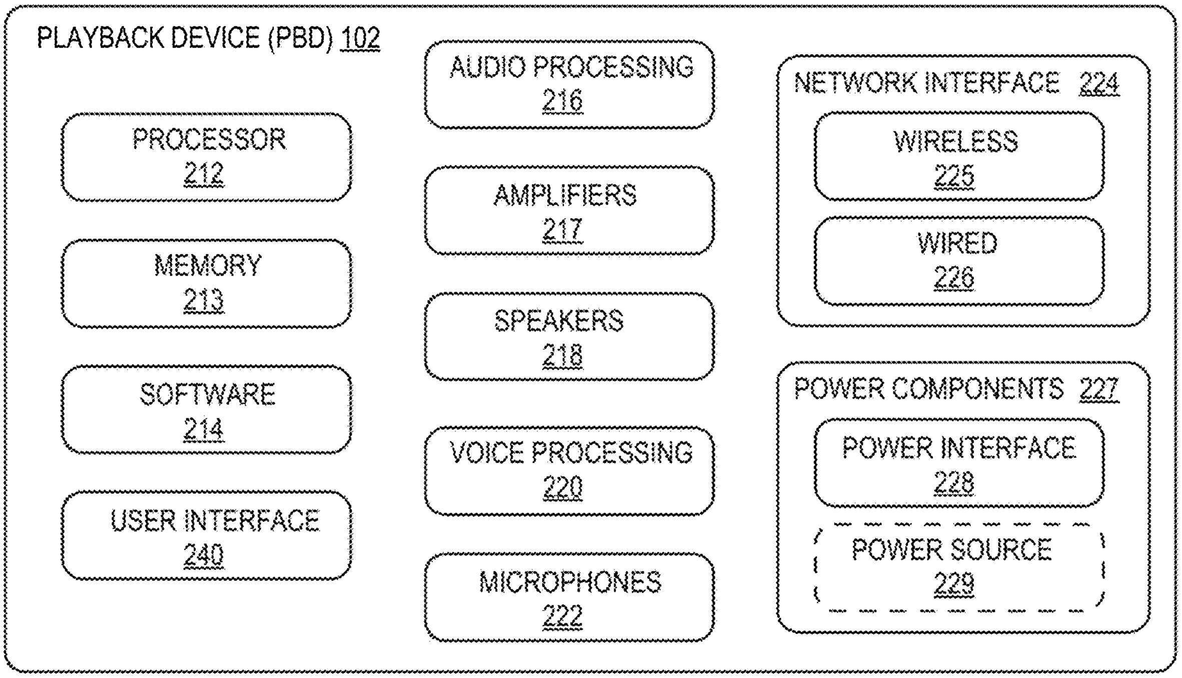
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
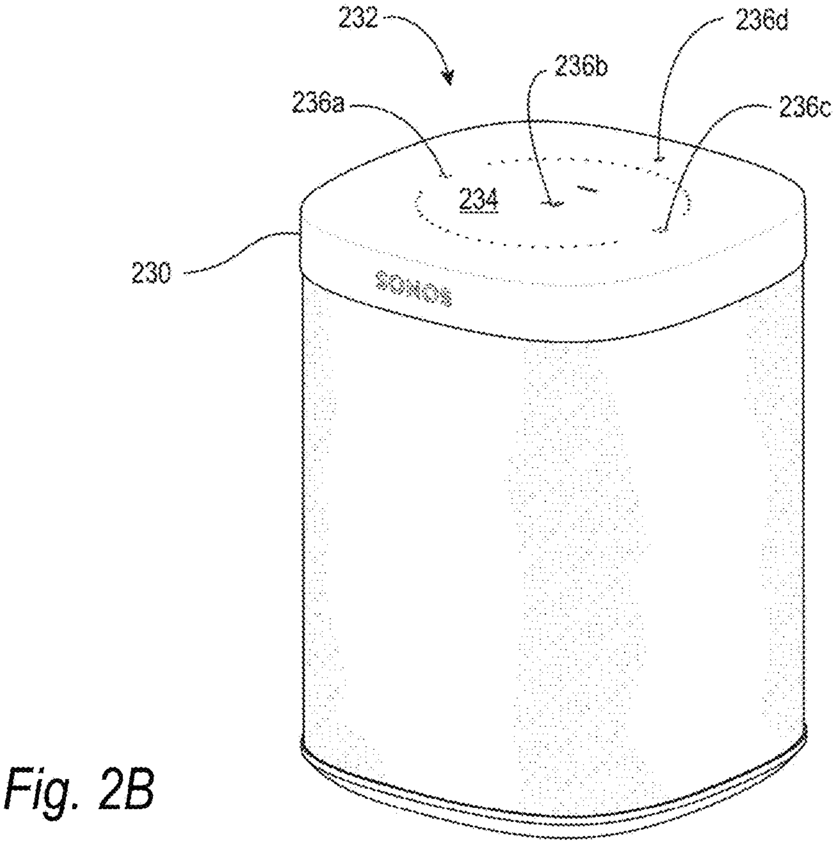
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
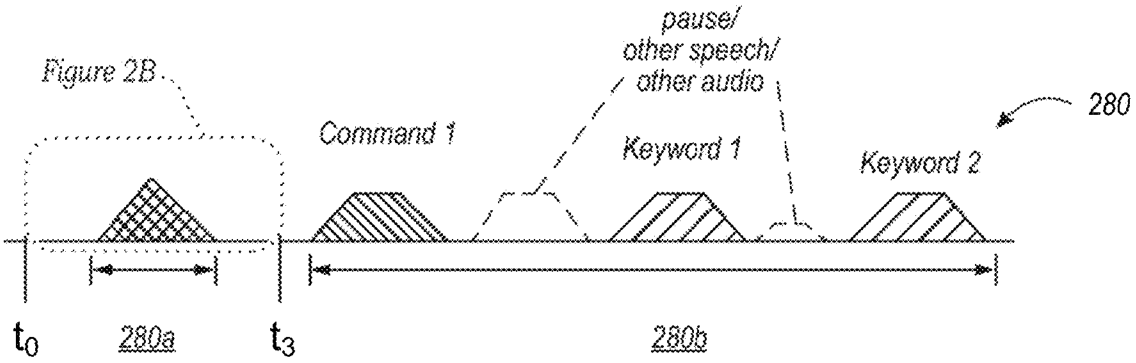
FIG. 2C is a diagram of an example voice input.

FIG. 2C is a diagram of an example voice input 280 that may be processed by an NMD or an NMD-equipped playback device. The voice input 280 may include a keyword portion 280*a* and an utterance portion 280*b*. The keyword portion 280*a* may include a wake word or a local keyword.

In the case of a wake word, the keyword portion 280*a* corresponds to detected sound that caused a VAS wake-word event. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, or "Hey, Ski" to invoke the APPLE® VAS, among other examples. In practice, a wake word may also be referred to as, for example, an activation-, trigger-, wakeup-word or -phrase, and may take the form of any suitable word, combination of words (e.g., a particular phrase), and/or some other audio cue.

The utterance portion 280*b* corresponds to detected sound that potentially comprises a user request following the keyword portion 280*a*. An utterance portion 280*b* can be processed to identify the presence of any words in detected-sound data by the NMD in response to the event caused by the keyword portion 280*a*. In various implementations, an underlying intent can be determined based on the words in the utterance portion 280*b*. In certain implementations, an underlying intent can also be based or at least partially based on certain words in the keyword portion 280*a*, such as when keyword portion includes a command keyword. In any case, the words may correspond to one or more commands, as well as a certain command and certain keywords.

A keyword in the voice utterance portion 280*b* may be, for example, a word identifying a particular device or group in the MPS 100. For instance, in the illustrated example, the keywords in the voice utterance portion 280*b* may be one or more words identifying one or more zones in which the music is to be played, such as the Living Room and the Dining Room (FIG. 1A). In some cases, the utterance portion 280*b* may include additional information, such as detected pauses (e.g., periods of non-speech) between words spoken by a user, as shown in FIG. 2C. The pauses may demarcate the locations of separate commands, keywords, or other information spoke by the user within the utterance portion 280*b*.

Based on certain command criteria, the NMD and/or a remote VAS may take actions as a result of identifying one or more commands in the voice input. Command criteria may be based on the inclusion of certain keywords within the voice input, among other possibilities. Additionally, state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280*a*. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
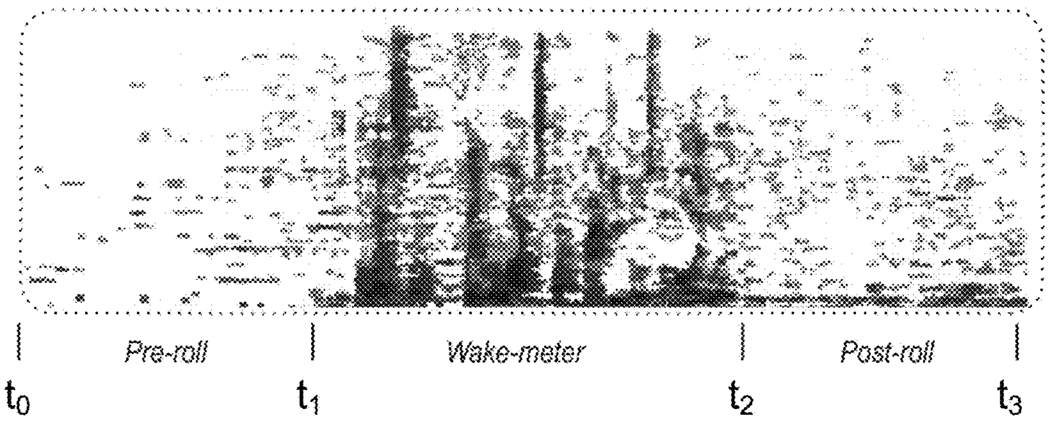
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280*a* of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for local keyword detection may be tuned to accommodate a wide range of keywords (e.g., 5, 10, 100, 1,000, 10,000 keywords). Local keyword detection, in contrast to wake-word detection, may involve feeding ASR output to an onboard, local NLU which together with the ASR determine when local keyword events have occurred. In some implementations described below, the local NLU may determine an intent based on one or more keywords in the ASR output produced by a particular voice input. In these or other implementations, a playback device may act on a detected command keyword event only when the playback devices determines that certain conditions have been met, such as environmental conditions (e.g., low background noise).

b. Example Playback Device Configurations

Figure 3B:
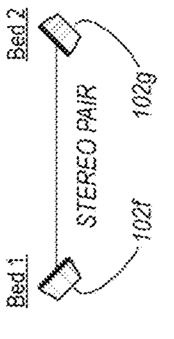
FIGS. 3A, 3B, 3C, 3D and 3E are diagrams showing example playback device configurations in accordance with aspects of the disclosure.
Figure 3C:
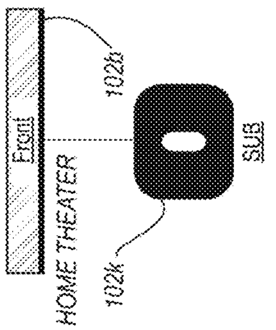
Figure 3D:
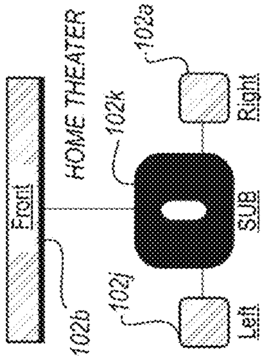
Figure 3E:
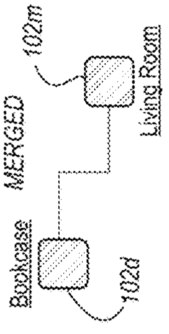
Figure 3A:
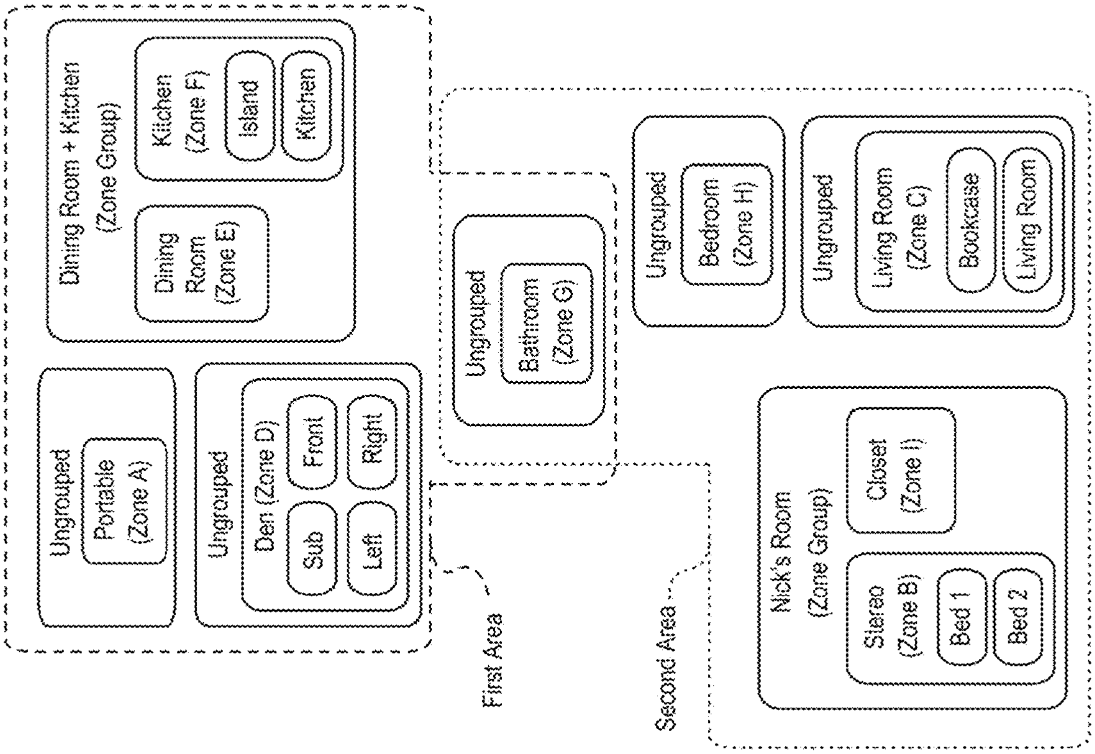

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system.

The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

Figure 4:
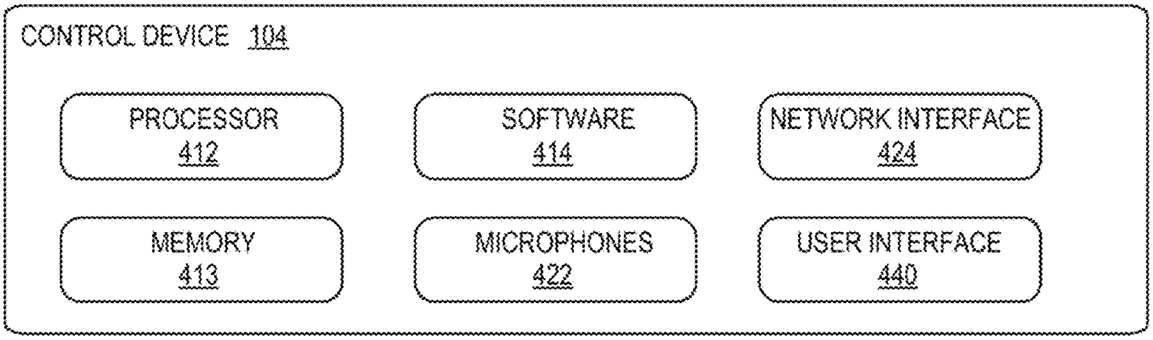
FIG. 4 is a functional block diagram of an example controller device in accordance with aspects of the disclosure.

FIG. 4 is a functional block diagram illustrating certain aspects of a selected one of the controller devices 104 of the MPS 100 of FIG. 1A. Such controller devices may also be referred to herein as a “control device” or “controller.” The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

Figure 5A:
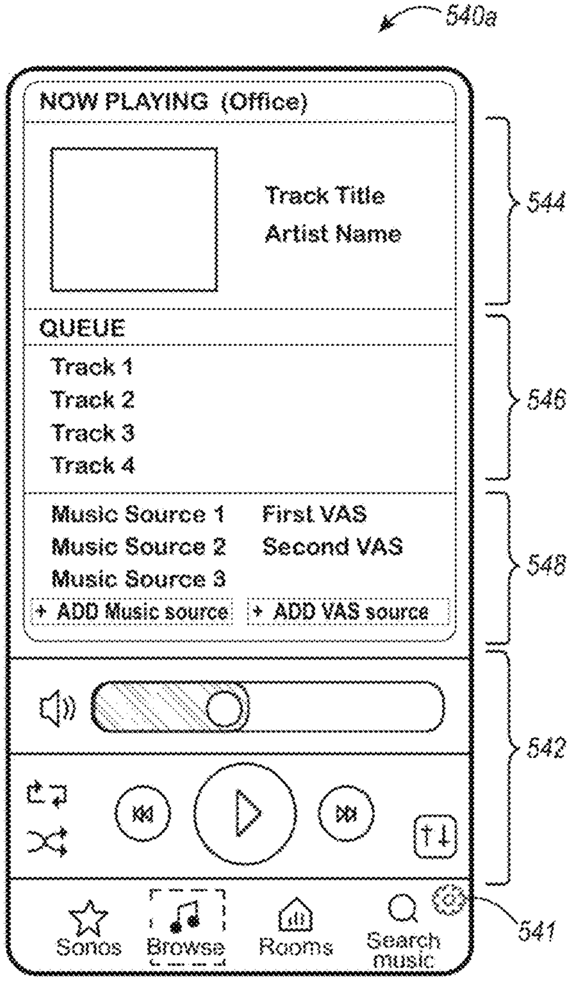
FIGS. 5A and 5B are controller interfaces in accordance with aspects of the disclosure.
Figure 5B:
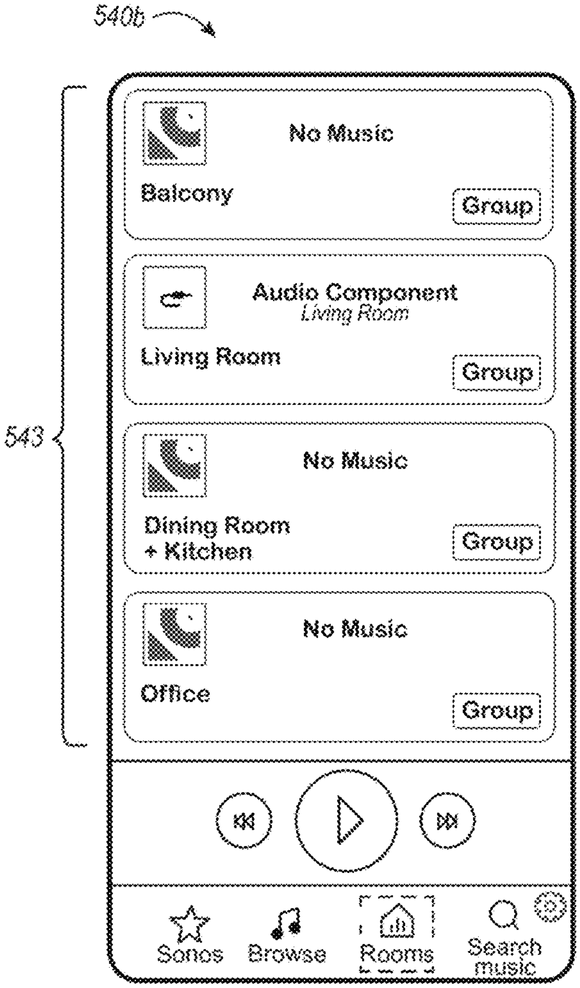

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VAS es may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102*a* and 102*b* in the Living Room shown in FIG. 1A, and a second VAS to the NMD 103*f* in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
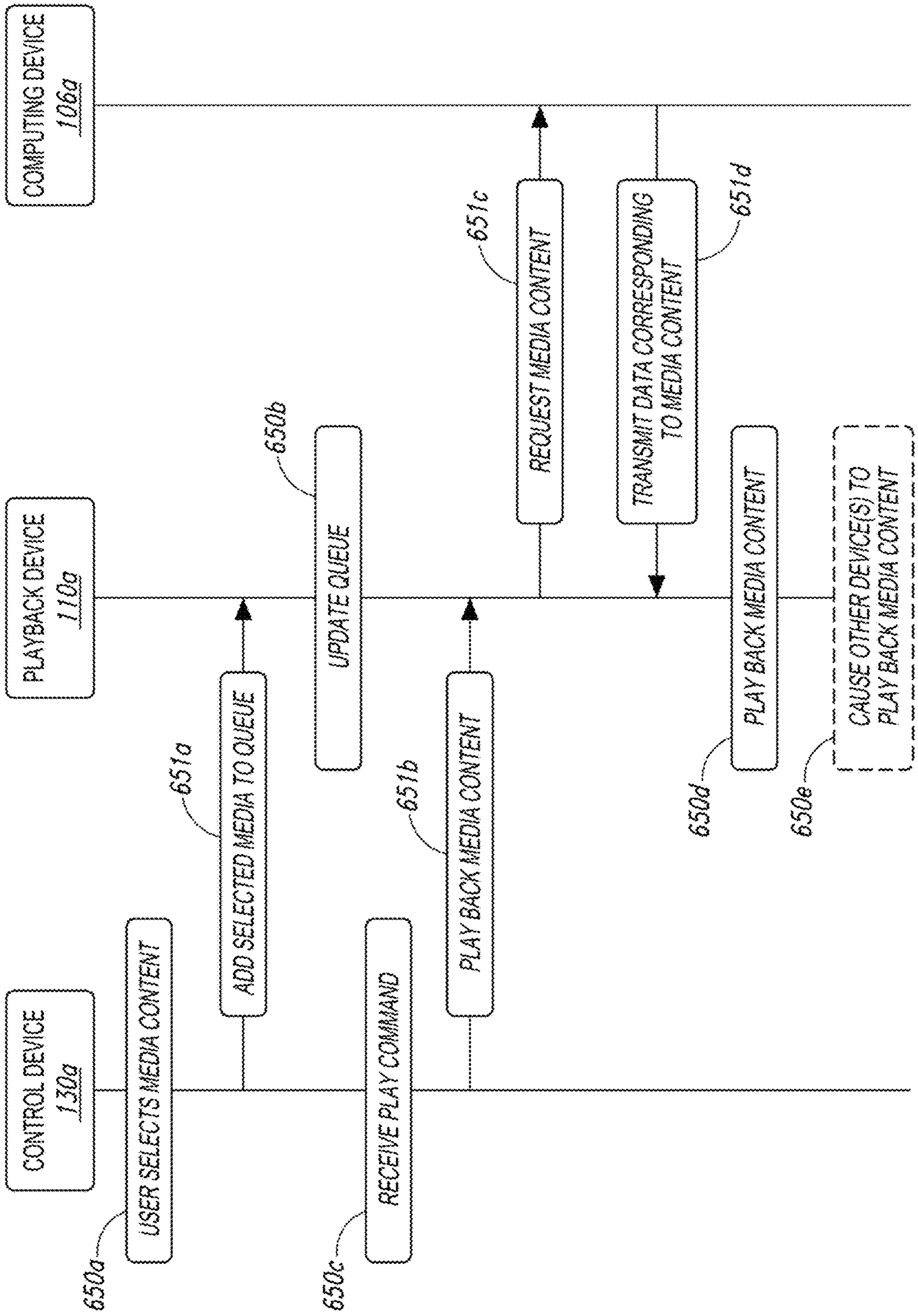
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

Within examples, such messages may conform to one or more protocols or interfaces (e.g., an Application Programming Interface). A platform API may support one or more namespaces that include controllable resources (e.g., the playback devices 102 and features thereof). Various functions may modify the resources and thereby control actions on the playback devices 102. For instance, HTTP request methods such as GET and POST may request and modify various resources in a namespace. Example namespaces in a platform API include playback (including controllable resources for playback), playbackMetadata (including metadata resources related to playback), volume (including resources for volume control), playlist (including resources for queue management), and groupVolume (including resources for volume control of a synchrony group), among other examples. Among other examples, such messages may conform to a standard, such as universal-plug-and-play (uPnP).

III. Example Audio Playback Device Calibration

Examples described herein relate to calibration of audio playback devices in a media playback system, such as the playback devices 102 of the media playback system 100 (FIG. 1A). The playback devices 102 described herein may utilize various calibration procedures, which may calibrate the playback devices 102 using one or more calibration techniques. In some implementations, the media playback system 100 supports multiple types of calibration. For instance, different calibration procedures being used for different types of playback devices 102 (e.g., with different capabilities) or in different situations (e.g., with or without user involvement).

Figure 7A:
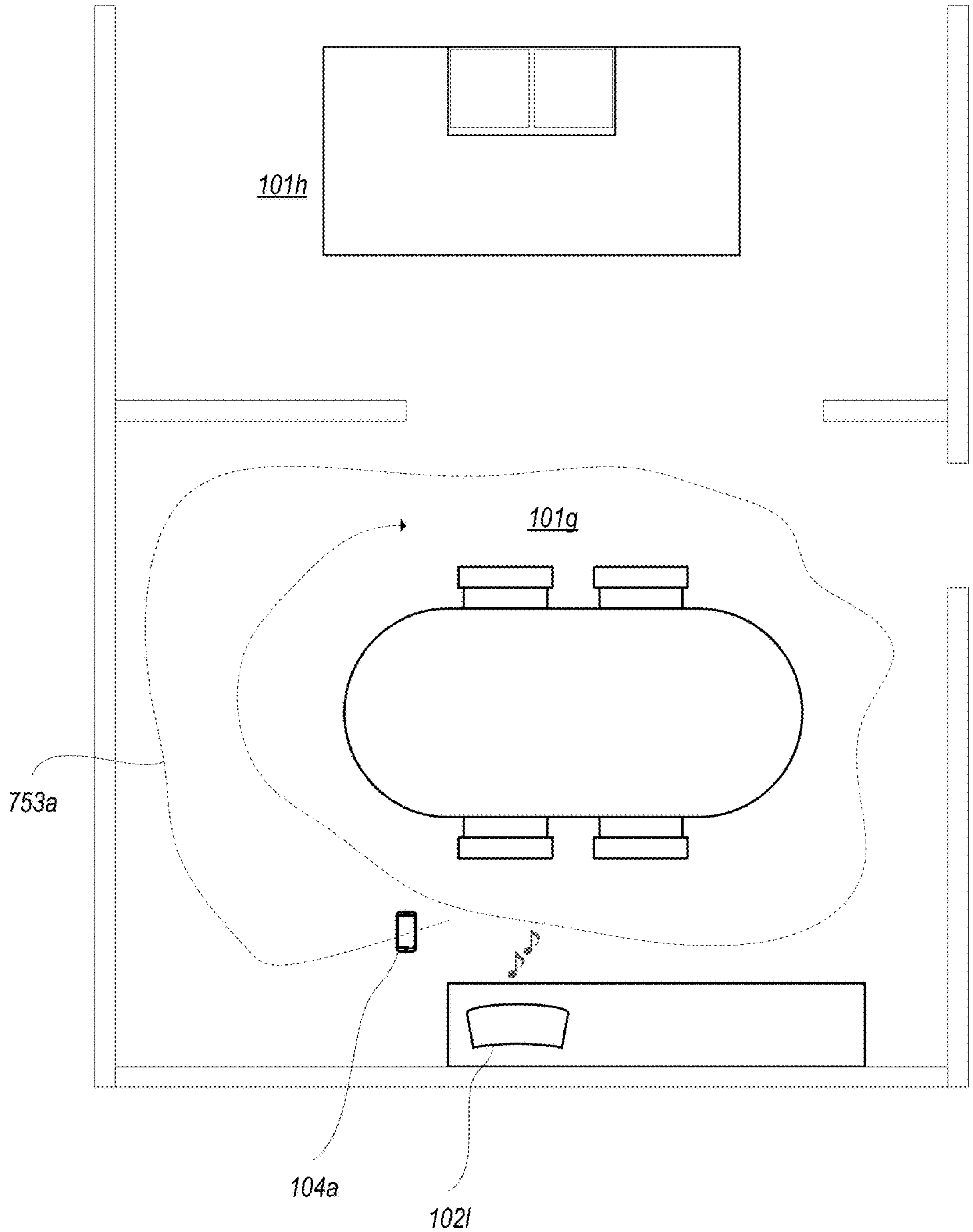
FIGS. 7A, 7B, and 7C are diagrams illustrating example calibration techniques in accordance with aspects of the disclosed technology.

FIG. 7A illustrates an example of a manual spectral calibration as performed in a listening area, which in this example is the Dining Room 101*g* (FIG. 1A). The example manual spectral calibration involves the control device 104*a* capturing audio played back by the playback device 102*l* via one or more microphones of the control device 104*a* (e.g., the microphones 422, as illustrated in FIG. 4). The control device 104*a* (or another device or devices) determines a spectral response of the playback device 102*l* in the Dining Room 101*g* based on the captured audio. The control device 104*a* may then determine a calibration profile (e.g., an equalization) that offsets (at least partially) the acoustic characteristics of the Dining Room 101*g* when applied to playback by the playback device 102*l*.

The manual spectral calibration is "manual" in that the procedure involves a user moving the control device 104*a* along a path 753*a* while capturing calibration sound(s) played back by the playback device 102*l* during the manual spectral calibration procedure. At various points along the path, the control device 104*a* captures samples of the calibration sound(s) at different locations, which may be combined to provide a more complete representation of the acoustic characteristics of the Dining Room 101*g*. The user may also move the control device 104*a* upwards and downwards while moving along the path 753*a* so as to capture samples of the calibration sounds at different heights in various positions along the path 753*a*. Further details of the manual spectral calibration are described in, for example, in U.S. Pat. No. 9,706,323, titled "Playback Device Calibration," which was previously incorporated by reference in its entirety.

In some example manual calibration procedures, the control device 104*a* may display prompts that guide the user to perform the "manual" aspects of the calibration procedure(s). For instance, the control device 104*a* may prompt a user to walk around the listening area (e.g., the Dining Room 101*g*) while carrying the control device 104*a*, thereby forming the path 753*a*. Additional details of user guidance during manual calibration procedures are described in, for example, in U.S. Pat. No. 10,372,406, titled "Calibration Interface," which is incorporated herein by reference in its entirety.

The calibration sound(s) output by the playback device(s) 102 during calibration may take different forms in various examples. In some examples, the playback devices 102 may output a specialized calibration sound that includes content across a calibration frequency range. For instance, the playback device 102*l* may output a hybrid test tone having a sweep portion and a noise portion. Additional details of calibration sounds that may be output during example calibration procedures are described in, for example, in U.S. Pat. No. 9,736,584, titled "Hybrid Test Tone For Space-Averaged Room Audio Calibration Using a Moving Microphone," which is incorporated herein by reference in its entirety. In other examples, the playback devices 102 may output user-selected content, such as music.

In some examples, example calibration procedures may calibrate multiple playback devices concurrently. For instance, a bonded zone of playback devices 102 in a stereo pair (FIG. 3B) or home theatre configuration (FIGS. 3C and 3D) may be calibrated concurrently. Such a calibration may enhance synchronous playback by the bonded playback devices 102.

Figure 7B:
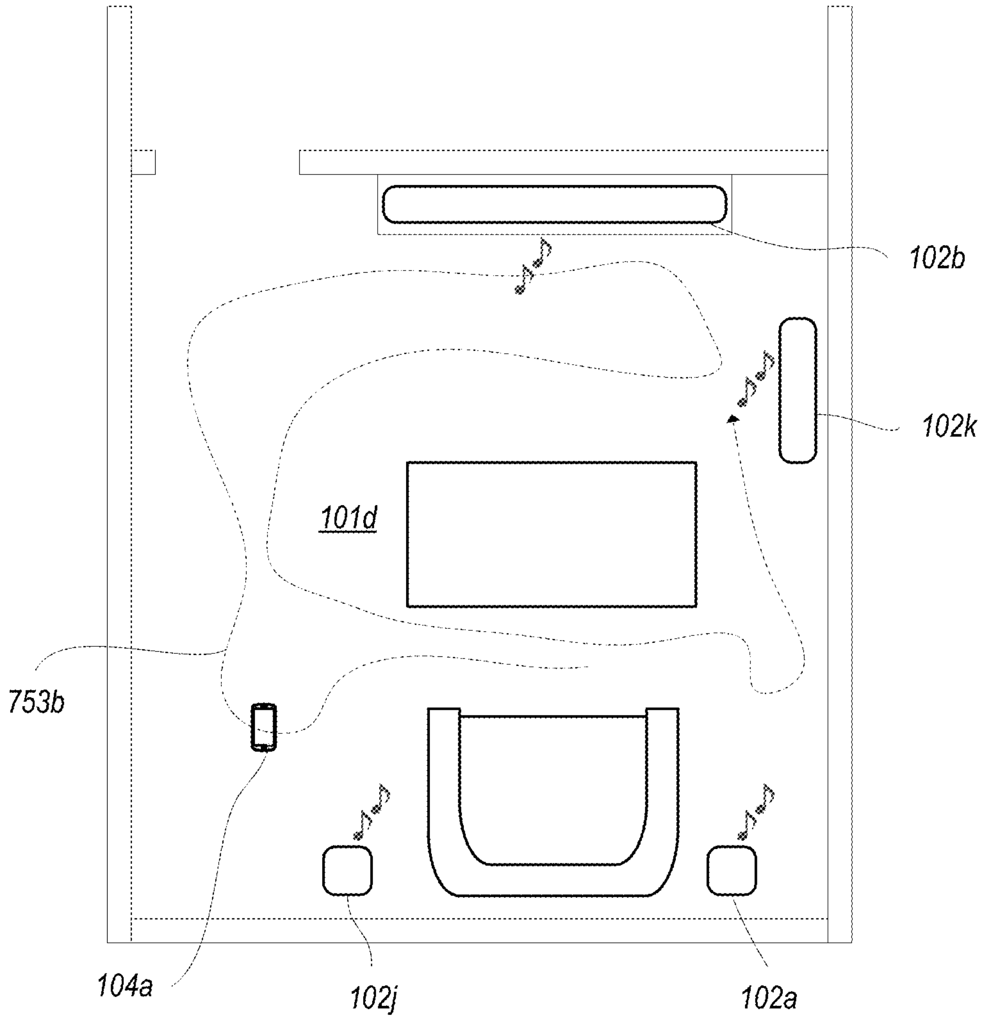

To illustrate, FIG. 7B illustrates an example of a manual spectral calibration of multiple playback devices 102 as performed in a listening area, which in this example is the Den 101*d* (FIG. 1A). The Den 101*d* zone includes the playback device 102*a*, the playback device 102*b*, the playback device 102*j* and the playback device 102*k*. Similar to the manual calibration procedure described in connection with FIG. 7A, the manual spectral calibration of the Den 101*d* zone involves the control device 104*a* capturing audio played back by the playback devices 102 via one or more microphones of the control device 104*a* (e.g., the microphones 422, as illustrated in FIG. 4). The control device 104*a* (or another device or devices) determines spectral responses of the multiple playback devices 102 in the Den 101*d* based on the captured audio. The control device 104*a* may then determine calibration profiles (e.g., equalizations) that offset (at least partially) the acoustic characteristics of the Dining Room 101*g* when applied to playback by the playback device 102*a*, the playback device 102*b*, the playback device 102*j* and/or the playback device 102*k*. Additional details regarding spatial calibration can be found, for example, in U.S. Pat. No. 9,794,710, titled "Spatial Audio Correction," which is incorporated by reference in its entirety".

To obtain individual spectral responses for the multiple playback devices 102 in the Den 101*d*, the multiple playback devices 102 may stagger output of a calibration sound such that the multiple playback devices 102 output non-overlapping audio as the user moves the control device 104*a* along the path 753*b*. Such staggering of output permits the control device 104*a* to identify individual output by the playback device 102*a*, the playback device 102*b*, the playback device 102*j* and/or the playback device 102*k*. Respective samples from the playback devices 102 are then used to determine respective spectral responses for each of the playback devices 102. Additional details relating to concurrent calibration of multiple playback devices are described in, for example, in U.S. Pat. No. 9,648,422, titled "Concurrent Multi-Loudspeaker Calibration with a Single Measurement," which is incorporated herein by reference in its entirety.

In some examples, a playback device may include multiple, individually drivable audio transducers (i.e., speakers). In such examples, example calibration procedures may individually calibrate each audio transducer (or a set of two or more similarly driven transducers). For instance, two or more audio transducers may sum their output to form a sound axis, which may be calibrated similar to an individual playback device 102 or driver. Similar to multiple playback devices, during calibration, the individual (or sets of) audio transducers under calibration may stagger their output to facilitate capture of individual output from each arrangement. Additional details relating to concurrent calibration of multiple audio transducers are described in, for example, in U.S. Pat. No. 9,860,670, titled "Spectral Correction Using Spatial Calibration," which was s incorporated herein by reference herein in its entirety.

With multiple playback devices 102 in a bonded zone or other grouping, sound from one playback device 102 (e.g., the playback device 102*b*) may arrive at a listener at a different time (e.g., later time) as compared with other playback devices 102 (e.g., the playback device 102*a* and/or the playback device 102*j*). As such, some example calibration procedures may additionally include a spatial calibration component. Such a spatial calibration component may offset differences in sound propagation time to a particular listening location.

Figure 7C:
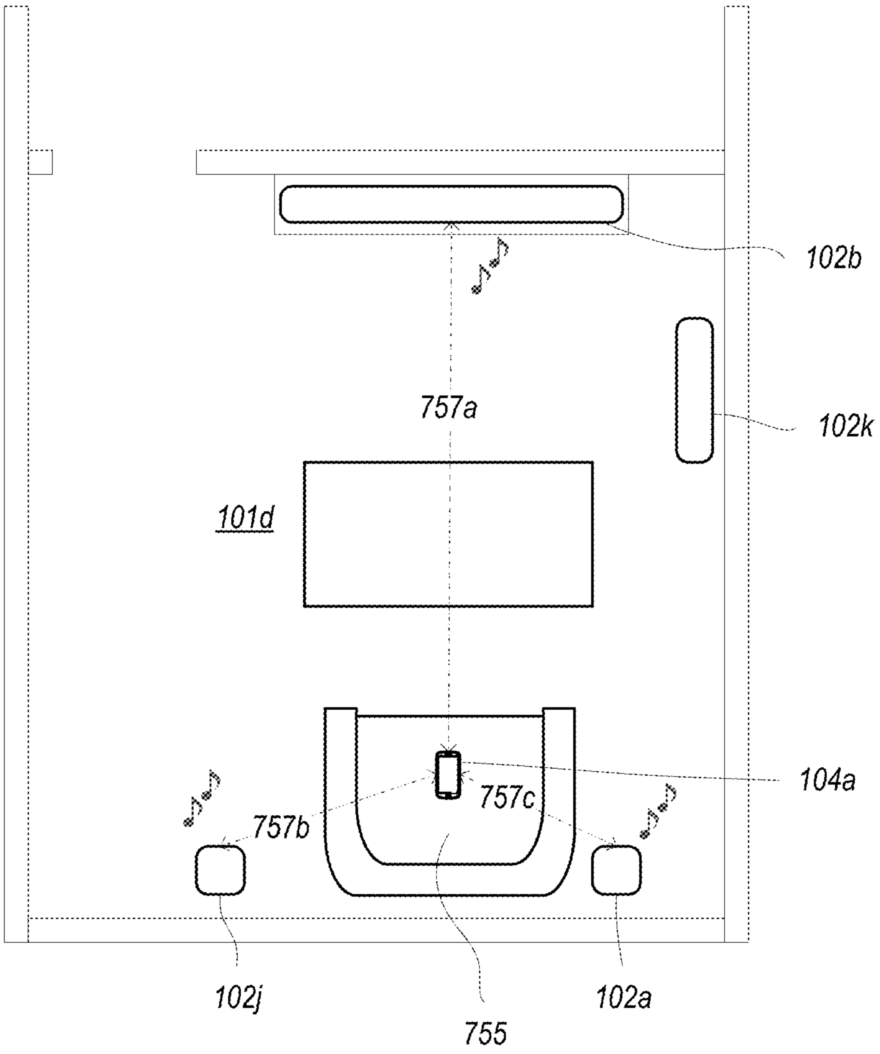

FIG. 7C illustrates a calibration procedure including a manual spatial calibration. During the manual spatial calibration, the user positions the control device 104*a* (and its microphones) at an intended listening location, represented here as a listening location 755. While at the listening location 755, the control device 104*a* may measure output from the playback device 102*b*, the playback device 102*a*, the playback device 102*j* and/or the playback device 102*k*, and then determine respective propagation times from each playback device 102 to the listening location 755 (e.g., along the sound propagation paths 757*a*, 757*b*, and 757*c*). The control device 104*a* (or a different device) may then determine a spatial calibration that (at least partially) offsets differences in propagation time from each playback device 102 in the Den 101*d* to the listening location 755.

Similar to the manual calibration procedure, the control device 104*a* may guide a user in performing such a manual spatial calibration. For instance, after guiding a user through a manual spectral calibration via one or more prompts, the control device 104*a* may guide the user through a manual spatial calibration using one or more additional prompts. Additional details of user guidance during manual calibration procedures are described in, for example, in U.S. Pat. No. 10,372,406, titled "Calibration Interface," which was previously incorporated herein by reference in its entirety.

Example calibration procedures may include both a spectral calibration (e.g., a spectral calibration component) and a spatial calibration (e.g., a spatial calibration component). That is, in addition to moving the control device 104*a* (and its microphones) along the path 753*b* during a manual spectral calibration component, the user may then position the control device 104*a* at the listening location 755 for a manual spatial calibration component. Such a calibration procedure would calibrate the playback devices 102 both spectrally and spatially for their respective positions in the Den 101*d*.

In some example calibration procedures, a spectral calibration may be performed first, and then applied by the playback devices 102 while performing a spatial calibration. Such a procedure may facilitate a calibration that includes both spatial and spectral correction. Examples regarding spatial calibration can be found, for example, in U.S. Pat. No. 9,860,670, titled "Spectral Correction Using Spatial Calibration," which was previously incorporated by reference herein in its entirety."

In addition to, or alternatively from, the manual calibration procedures described above, the playback devices 102 in the media playback system 100 may support self-calibration. In example self-calibration processes, a playback device 102 undergoing self-calibration may output calibration sound(s) and then capture its own output via one or more microphones. The playback device 102 may then determine its own self response.

Figure 8A:
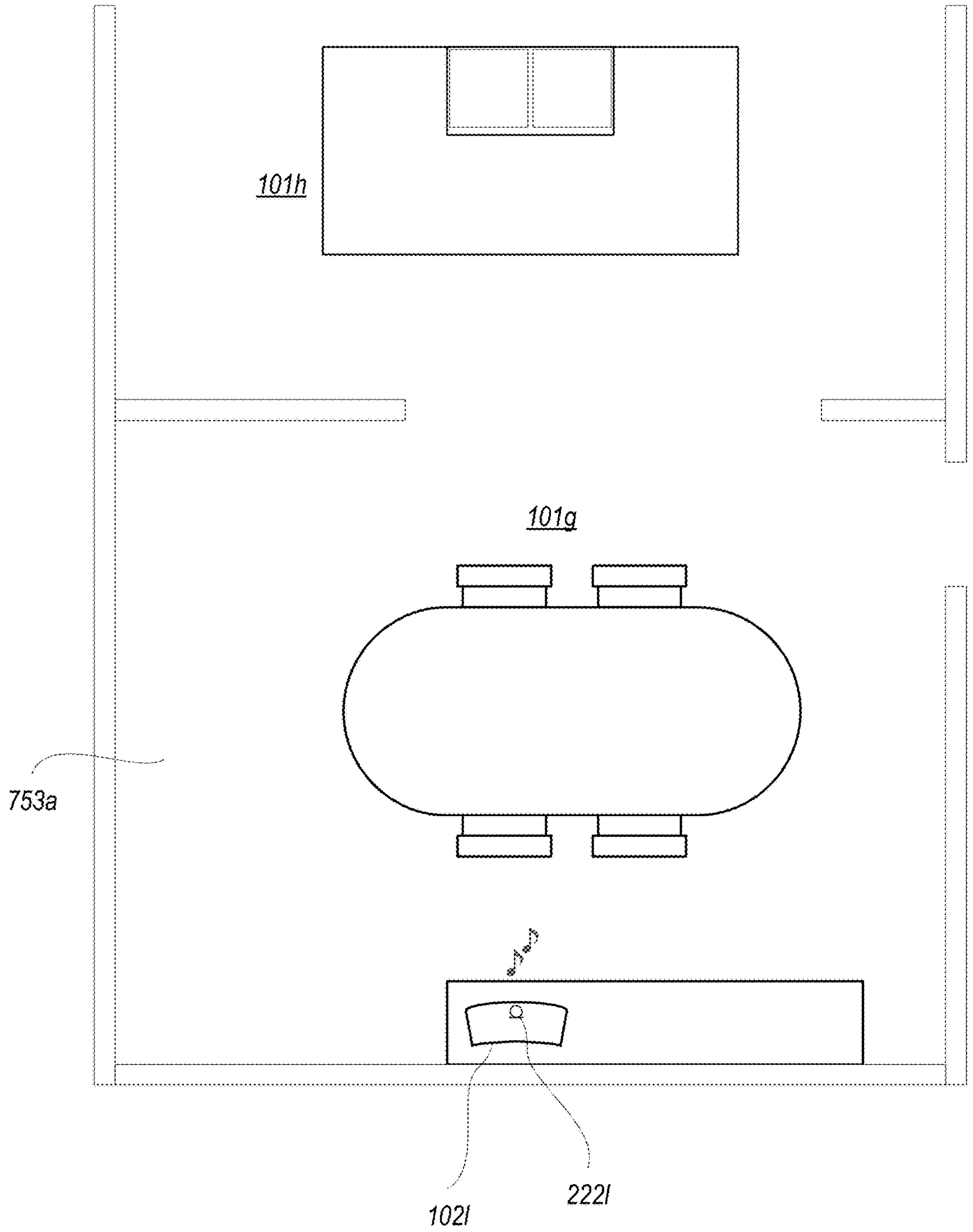
FIGS. 8A and 8B are diagrams illustrating example calibration techniques in accordance with aspects of the disclosed technology.

To illustrate, FIG. 8A illustrates a self-calibration procedure of the playback device 102*l* in the Dining Room 101*g*. The playback device 102*l* is shown as including one or more microphones 222*l*. As described in connection with FIG. 2A, example playback devices 102 may include one or more microphones 222, perhaps to facilitate voice control. During the self-calibration procedure, the playback device 102*l* captures its own playback via the one or more microphones 222*l*, and then determines its self-response in the Dining Room 101*g*.

After determining the self-response, the playback device 102*l* may identify a spectral calibration profile (e.g., an equalization) based on the self-response. In some examples, a mapping may be applied to the self-response to determine a second acoustic response representative of the listening area at a different location than that of the self-response. That is, the second acoustic response may be representative of an approximated acoustic response of the listening area as if it were measured from a generalized location or plurality of locations.

Within examples, such a mapping may be made via application of a transfer function, perhaps as generated via machine learning. To create such a mapping, a machine learning algorithm may have been trained on a large number (e.g., hundreds or thousands) of manual spectral calibration iterations in different listening areas. Unlike the manual calibration procedures, the determined response of the playback device 102*l* in the Dining Room 101*g* is not used to directly determine a calibration profile that offsets acoustic characteristics of the Dining Room 101*g*, but rather to find a previously determined calibration profile from manual calibrations in similar environments. Additional details regarding self-calibration can be found, for example, in U.S. Pat. No. 9,763,018, titled "Calibration of Audio Playback Devices," U.S. Pat. No. 10,299,061, titled "Playback Device Calibration," and U.S. Pat. No. 10,734,965, titled "Audio Calibration of a Portable Playback Device," which were previously incorporated by reference herein in their entirety.

In some examples, example self-calibration procedures utilize a portion of the voice input pipeline for capturing calibration sounds. A voice input pipeline, such as may be implemented in the voice processing 220 (FIG. 2A) may include processing steps such as acoustic echo cancellation to condition the captured audio. Additional details of audio capture using a voice input pipeline are described in, for example, in U.S. Pat. No. 10,299,061, titled "Playback Device Calibration," and U.S. Pat. No. 10,734,965, titled "Audio Calibration of a Portable Playback Device," which are each incorporated herein by reference in their entirety. In other examples, self-calibration procedures may utilize different microphones or not be configured to receive voice inputs.

Such self-calibration processes might not as consistently produce as accurate of a calibration as manual calibration procedures, but may be more convenient since such procedures do not necessarily involve a manual involvement by user. As such, portable playback devices 102 (which are typically more frequency re-positioned or re-oriented relative to wall-powered playback devices 102) may utilize such a self-calibration procedure to facilitate re-calibration (e.g., periodically or when the portable playback device is moved). Additional details regarding self-calibration of portable playback devices can be found, for example, in U.S. Pat. No. 10,299,061, titled "Playback Device Calibration," and U.S. Pat. No. 10,734,965, titled "Audio Calibration of a Portable Playback Device," which were previously incorporated by reference herein in their entirety.

Yet further, since self-calibration procedures do not require manual involvement by a user, wall-powered playback devices 102 may utilize self-calibration when a manual calibration is not available (e.g., because one has not been performed, or because the calibration is no longer valid because the playback device has been re-positioned or re-oriented). Then, a user may later perform a manual calibration procedure, which may supersede the self-calibration on the playback device 102. If the calibration profile determined via the self-calibration profile becomes no longer valid, then the playback device 102 may revert back to the self-calibration or perform a new self-calibration.

Some calibration procedures may involve both self-calibration and manual calibration components. For instance, a playback device 102 may utilize self-calibration for spectral calibration and a manual calibration for spatial calibration. Such calibration procedures allow for both spectral and spatial calibration with less user involvement as compared with a fully manual calibration procedure. Further, spectral calibrations may be limited to devices (e.g., control devices 104 and playback devices 102) have certain microphones with known acoustic characteristics, so that those characteristics can be accounted for in the calibration. Spatial calibrations may not be similarly limited, as the measurement of propagation delay is less affected by acoustic characteristics. As such, a calibration procedure involving both self-calibration and manual calibration components permits both spectral and spatial calibration using a wider variety of recording devices (for the spatial calibration component).

Figure 8B:
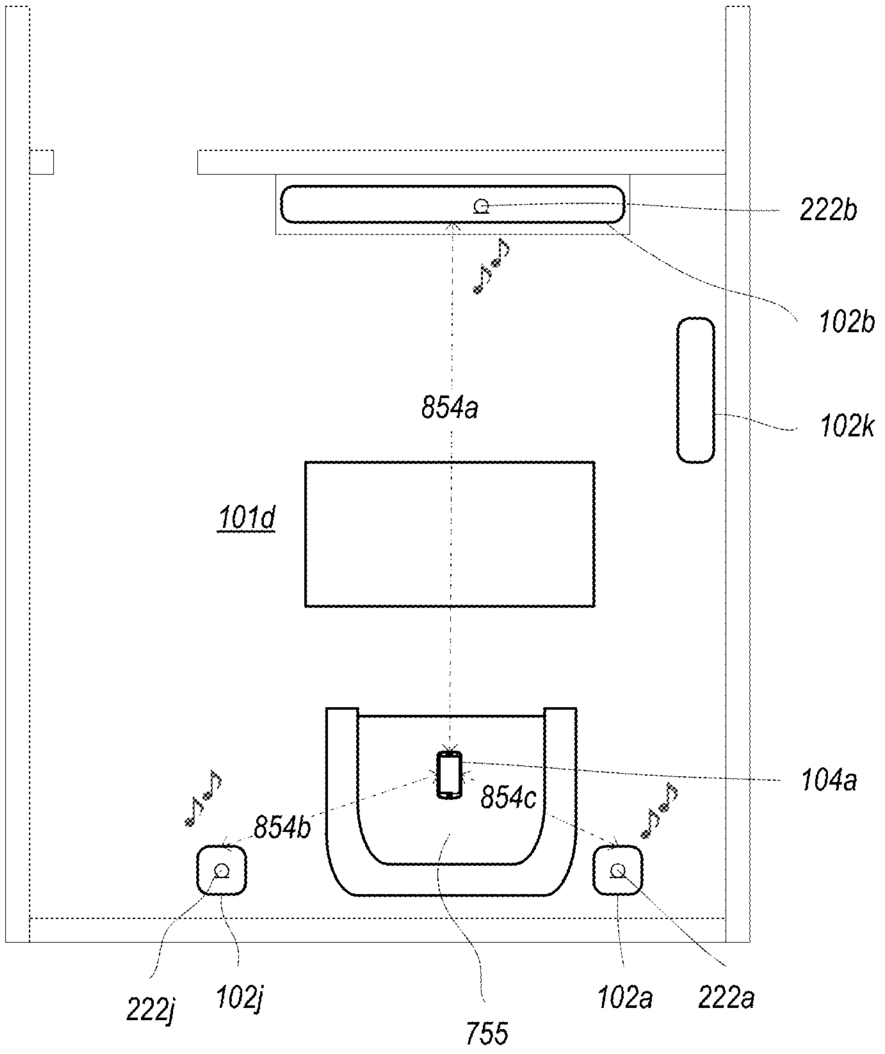

For purposes of illustration, FIG. 8B illustrates a hybrid calibration of the playback devices 102 in the den 101*d*. For spectral calibration, the playback devices 102 in the den 101*d* utilize self-calibration. However, for spatial calibration, the playback devices 102 in the den 101*d* utilize manual calibration. As illustrated, a control device 104*a* in a listening location measures propagation delay along the path 854*a* from the playback device 102*b* to the control device 104*a*, along the path 854*b* from the playback device 102*j* to the control device 104*a*, and along the path 854*c* from the playback device 102*a* to the control device 104*a*. The spatial calibration then at least partially offsets differences in propagation delay.

In some cases, some of the playback devices 102 in the media playback system 100 might not include a microphone. As such, these playback devices 102 might not be able to individually self-calibrate, as they are unable to record their own output without a microphone. In such cases, a player-to-player calibration procedure may in some cases be used to calibrate one or more non-microphone-enabled playback devices 102 with one or more microphone-enabled playback devices 102.

For instance, a bonded configuration that includes a non-microphone-enabled playback device 102 can be calibrated using a microphone-enabled playback device 102 (or vice-versa). In player-to-player calibration, non-microphone-enabled playback device(s) 102 play back a calibration sound while the microphone-enabled playback device 102 capture output of the non-microphone-enabled playback device(s). This captured output is used to calculate a spectral correction. The microphone-enabled playback device 102 may calibrate themselves (e.g., before calibrating the non-microphone-enabled playback device(s) 102) using the above-described self-calibration procedures.

Figure 9A:
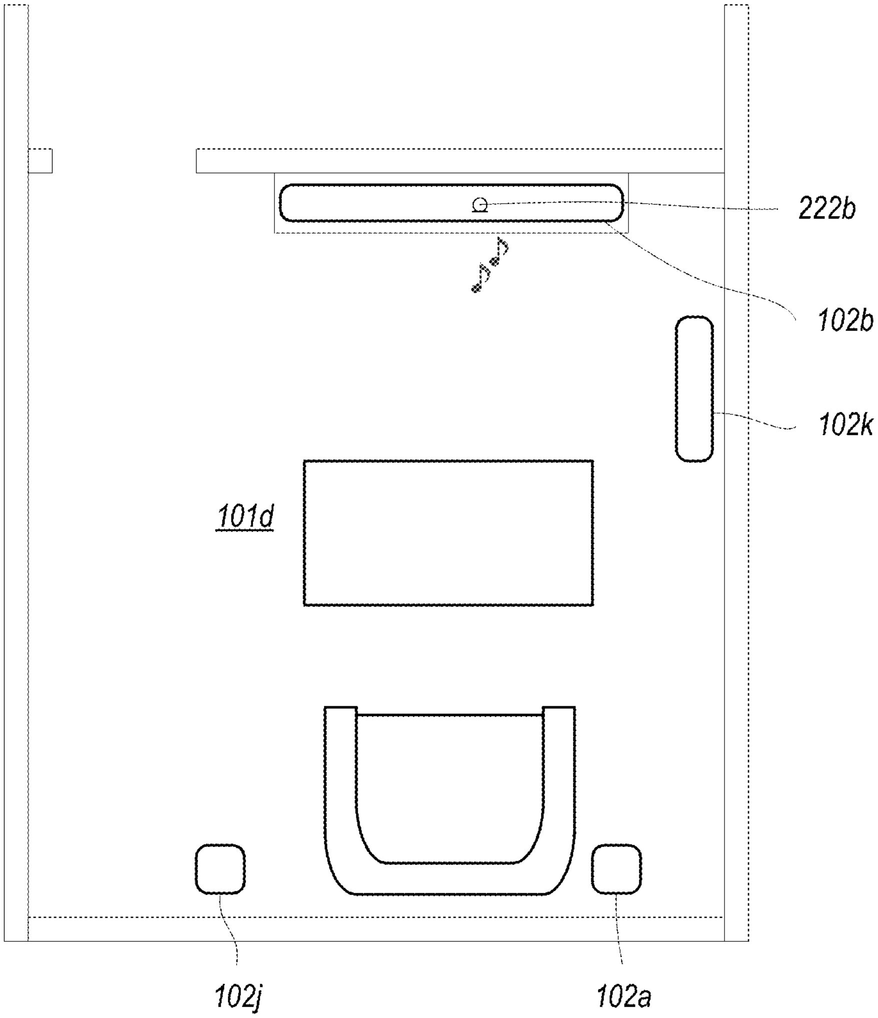
FIGS. 9A, 9B, 9C, and 9D are diagrams illustrating example calibration techniques in accordance with aspects of the disclosed technology.

For purposes of illustration, FIG. 9A illustrates a player-to-player calibration procedure of the playback device 102*a* and the playback device 102*j* in the Den 101*d*. As shown in FIG. 9A, the playback device 102*b* includes one or more microphones 222*b*, but in this example the playback device 102*a* and the playback device 102*j* exclude microphones. As such, the playback device 102*a* and the playback device 102*j* are unable to self-calibrate individually but may self-calibrate via the playback device 102*b* as part of the bonded zone in the Den 101*d*.

During a player-to-player calibration of the playback device 102*a*, the playback device 102*b* captures the output of the playback device 102*a* via the one or more microphones 222*b*. The playback device 102*a* (or another device, such as the playback device 102*a*) determines the response of the playback device 102*a* in the Den 101*d*. After determining the self-response, the playback device 102*b* may identify a spectral calibration profile (e.g., an equalization) based on the determined response, similarly to identification of a spectral calibration profile based on a self-response. The playback device 102*b* may then instruct the playback device 102*a* to apply this spectral calibration profile (e.g., by sending instructions to the playback device 102*a* via the LAN 111).

In some examples, the playback device 102*b* may identify the calibration profile via a machine learning algorithm that maps the determined response to a particular calibration profile. To create such a mapping, the machine learning algorithm is trained on a large number of manual spectral calibration iterations in different listening areas. By using a large number of manual spectral calibration iterations (e.g., hundreds or thousands) in different listening areas, the machine learning algorithm becomes statistically capable of providing a calibration profile appropriate for the acoustic characteristics in the Den 101*d*, as represented by the determined response.

This player-to-player calibration process may be similarly performed for the playback device 102*j*, as well as other playback devices 102 in the bonded zone without a microphone (e.g., the playback device 102*k*). In further examples, example player-to-player calibration processes may be performed with any two or more playback devices 102 in the media playback system 100, provided that they are in audible range of one another (so as to facilitate capture of calibration sounds being output by the other device). For instance, a microphone-equipped playback device 1021in the Dining Room 101*g* (FIG. 1A) may calibrate a non-microphone-equipped playback device 102*i* in the Kitchen 101*h*, among other examples.

As discussed above (e.g., with respect to FIGS. 3A-3E), in addition to bonded configurations such as stereo pairs or home theatre configurations, the playback devices 102 can be joined into groups, which may inform player-to-player calibration process. For instance, a user may create a group including the Dining Room 101*g* and Kitchen 101*h* (which include the playback device 102*l* and the playback device 102*i*, respectively) (FIG. 1A). In an example, microphones on the playback device 102*l* in the Dining Room 101*g* may be used to calibrate the playback device 102*i* in the Kitchen 101*h*. Many variations are possible.

Further, in some examples, two or more microphone-equipped playback devices 102 may use the example player-to-player calibration techniques. While such playback devices 102 may be configured to perform self-calibration, in some cases, player-to-player calibration may be beneficial as an additional or alternative calibration technique. For instance, player-to-player calibration may be utilized when one or more microphones on a microphone-equipped playback device 102 are damaged, obstructed, or otherwise unable to perform satisfactory measurements.

In further examples, player-to-player calibration may augment self-calibration, perhaps by providing additional samples of the output of a playback device 102 under calibration from a different location within the environment. In such examples, samples from the playback device 102 as well as one or more additional playback devices 102 may be considered in determining the calibration. For example, samples from respective playback devices may be averaged (e.g., via a weighed average) or otherwise combined, which may provide a more representative sampling of the output of the playback device in the environment.

In alternative examples, the playback device 102*b* may determine the calibration profile based on the determined response. That is, similar to the manual calibrations, the playback device 102*b* may determine a calibration profile that offsets acoustic characteristics represented in the determined response, rather than using the determined response to identify a pre-determined calibration profile. Such a calibration might not as reliably offset acoustic characteristics within a listening area, as compared with a manual spectral calibration, given that example manual spectral calibrations may involve capturing sample output of the playback device 102 under calibration at multiple locations within the listen area (e.g., along a path, such as the paths 753). However, such a calibration may be desirable in certain circumstances, such as when a calibration profile based on a manual spectral calibration and/or a pre-determined calibration profile is not available.

Figure 9B:
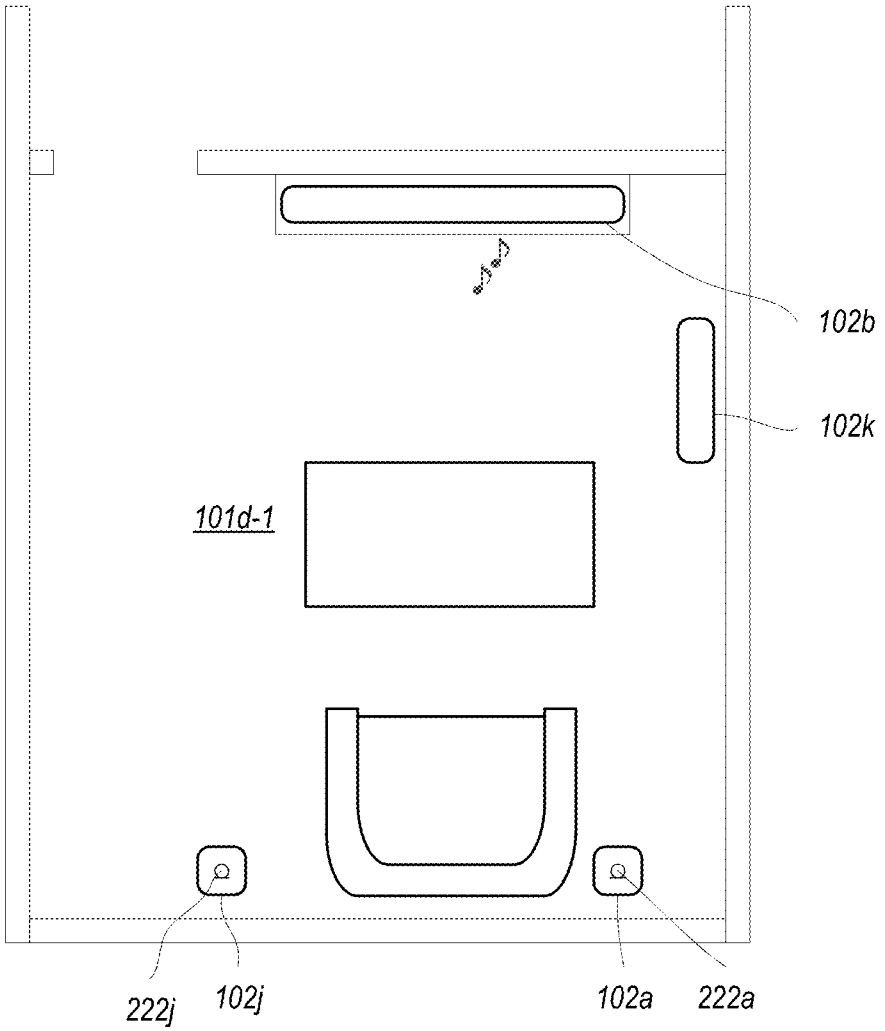

When there are multiple microphone-equipped playback devices 102 within audible range (e.g., in the same bonded group) of the playback device 102 under calibration, each playback device 102 may capture the output of the playback device 102 under calibration, thereby obtaining samples of its output from different positions. For instance, FIG. 9B illustrates a player-to-player calibration procedure of the playback device 102*b* in a variation of Den 101*d*, which is designated as the Den 101*d*-1. As shown in FIG. 9B, the playback device 102*a* and the playback device 102*j* are equipped with microphone(s) 222*a* and microphone(s) 222*j*, respectively.

During example player-to-player calibration procedure, the playback device 102*a* and the playback device 102*j* may each capture playback of calibration sounds by the playback device 102*b*. Similar to the multiple samples along the path 753 in example manual spectral calibrations, samples from each microphone-equipped playback device 102 may be averaged or otherwise combined to provide a more complete representation of the response of the playback device 102*b* in the Den 101*d*-1. Such a representation may result in more reliable or accurate identification of a pre-determined calibration profile or determination of a calibration profile that more accurately offsets acoustic characteristics of the Den 101*d*-1.

In some examples, samples from multiple playback devices may be combined using a weighed average. The weights may be combined using any suitable weighting, such as by signal-to-noise ratio or other indicators of sample quality. Such a weighting may result in "better" (i.e., clearer, closer, or otherwise more representative) measurements of the playback device output to have more effect on the calibration profile.

Within example, certain home theatre bonded zone configurations may include one or more playback devices 102 configured to output additional surround channels and/or object-based content, such as DOLBY® TrueHD® height channels, DTS:HD channels, or DOLBY® ATMOS® objects, among other examples. Such playback devices 102 may include side- and/or -upward firing transducers to orient sound appropriately to sound format. During synchronous playback as part of a bonded zone, the playback devices 102 may output respective channels of the surround format or may coordinate in representing objects in an object-based format.

Figure 9C:
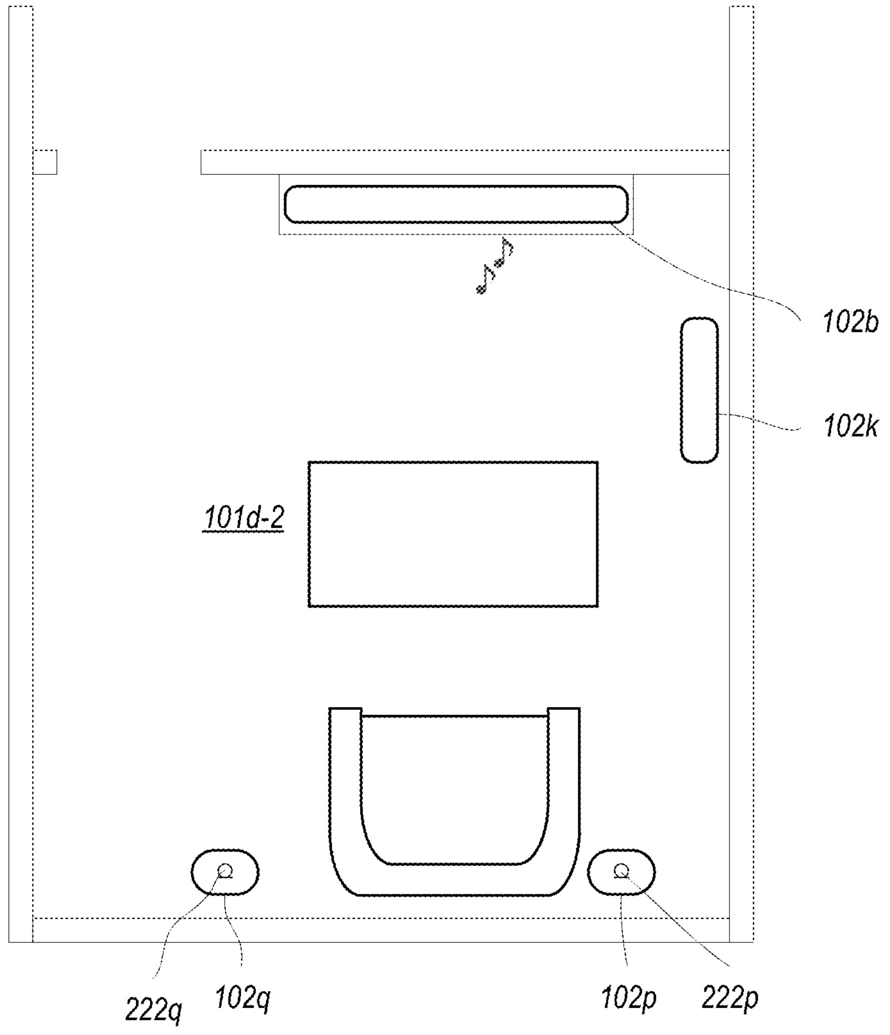

To illustrate, FIG. 9C includes another variation on the Den 101*d*, which is denoted as the Den 101*d*-2. In this example, the playback device 102*a* and the playback device 102*j* have been replaced with a playback device 102*p* and a playback device 102*q*. The playback device 102*p* and a playback device 102*q* are equipped with respective side-firing transducers, a forward-firing transducer, and one or more upward firing transducers, which facilitates reproduction of surround or object-based formats, such as those noted above. For instance, the forward-firing and side-firing transducers may facilitate reproduction of direct and ambient sound, respectively, while the upward-firing transducer(s) facilitate reproduction of height channels and/or overhead objects.

As shown in FIG. 9C, the playback device 102*p* and the playback device 102*q* include one or more microphones 222*p* and one or more microphones 222*q*, respectively. These microphones may be used in example player-to-player calibration procedures in a similar manner as discussed with respect to FIGS. 9A and 9B. For instance, the playback device 102*p* and the playback device 102*q* may capture output of the playback device 102*b* and/or the playback device 102*k*, so as to facilitate calibration of those playback devices 102. Additionally, the playback device 102*p* and the playback device 102*q* may self-calibrate, or be calibrated using a manual calibration procedure, or via a combination of manual and self-calibration components, as discussed with respect to FIGS. 7A-9B.

Within examples, a subwoofer playback device may use player-to-player calibration. In contrast to other example playback devices, a subwoofer playback device may be configured to output a relatively smaller range of frequencies (e.g., bass frequencies) as compared with, for example, a full range of frequencies (e.g., 20-20 kHz). As illustrated in connection with FIGS. 3C and 3D, among others, a subwoofer playback device may be bonded with one or more playback devices, which may output audio in frequencies above the output of the subwoofer playback device (e.g., mid and treble frequencies).

Figure 9D:
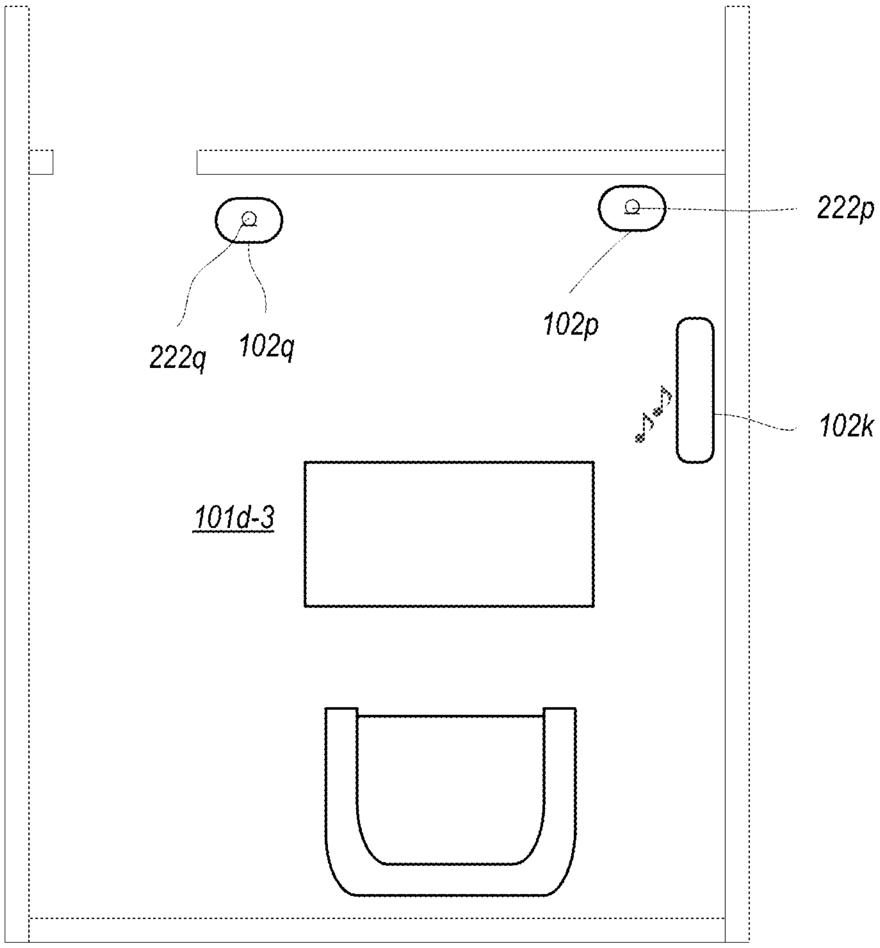

FIG. 9D illustrates player-to-player calibration of a subwoofer playback device 102*k* in yet another variation of the Den 101*d*, which is denoted as the Den 101*d*-3. As shown in FIG. 9D, the subwoofer playback device 102*k* is bonded to the playback device 102*p* and the playback device 102*q*, which in this example are bonded as a stereo pair (FIG. 3B-3D). In particular, in this example stereo pair, the playback device 102*q* is configured to play back a left channel of stereo audio content and playback device 102*p* is configured to play a right channel of the stereo audio content while the subwoofer playback device 102*k* is configured to play back frequencies of the audio content below a crossover frequency.

As noted above, the respective outputs of the playback device 102*p* and the playback device 102*q* as compared with the subwoofer playback device 102*k* are delineated at a crossover frequency (e.g., 70 Hz). In such examples, one or more filters are applied to output of the subwoofer playback device 102*k* and/or the playback device(s) 102*p* and 102*q* such that the subwoofer playback device 102*k* outputs portions of audio content below the crossover frequency and the playback device(s) 102*p* and 102*q* output portions of the audio content above the crossover frequency. In implementations, filtering may result in some overlap in output as the playback devices 102*k*, 102*p*, and 102*q* fade in/out smoothly through frequencies around the crossover frequency.

In an example, the player-to-player calibration of a subwoofer playback device 102*k* may involve prediction of a room-average power spectral density from impulse response measurements. To measure impulse response(s), output from the subwoofer playback device 102*k* may be measured at one or more positions (e.g., the positions of the microphone(s) 222*p* and/or one or more microphone(s) 222*q*) within the environment (e.g., the Den 101*d*). Within examples, as a bonded zone, the subwoofer playback device 102*k* may play back concurrently with the playback device 102*p* and the playback device 102*q*.

During an example calibration, the subwoofer playback device 102*k* outputs concurrently with the bonded playback device 102*p* and the bonded playback device 102*q*. The devices may stagger their output in different time slots. In particular, in a first time slot, the playback device 102*q* plays a left channel of calibration audio while in a second time slot the playback device 102*q* plays a right channel of calibration audio. In both time slots, the subwoofer playback device 102*k* outputs bass frequencies (e.g., frequencies below the crossover frequency). To obtain multiple samples, the measurements may repeat during subsequent time slots. Further examples are described in Appendix A of the specification.

In the example calibration, the output of the playback device 102*k* is measured by the microphones 222*q* and the microphones 222*p* in the time slots. That is, when the playback device 102*q* plays the left channel of calibration audio and the sub woofer playback device 102*k* outputs bass frequencies in the first time slot, the output is measured in multiple locations (i.e., at the microphones 222*q* and the at microphones 222*p*). Similarly, when the playback device 102*p* plays the right channel of calibration audio and the subwoofer playback device 102*k* outputs bass frequencies in the second time slot, the output is measured in the two locations (i.e., at the microphones 222*q* and the at microphones 222*p*).

Within examples, using left and right channels may improve prediction of the room-average power spectral density because the microphones 222*q* and the microphones 222*p* provide cross channel measurements. During the first time slot, the playback device 102*q* and the subwoofer playback device 102*k* may play some overlapping frequencies as practical filters may be non-ideal. As measured from the microphones 222*q*, the output of the playback device 102*q* in the overlapping frequencies is an extreme near-field measurement that may appear much louder than the output of the subwoofer playback device 102*k* in the same frequencies. On the other hand, as measured from the microphones 222*p*, the output of the playback device 102*q* is much further away and does not dominate the measurement to the same degree).

Similarly, during the second time slot, the playback device 102*p* and the subwoofer playback device 102*k* may play some overlapping frequencies. As measured from the microphones 222*p*, the output of the playback device 102*p* in the overlapping frequencies is an extreme near-field measurement that may appear much louder than the output of the subwoofer playback device 102*k* in the same frequencies. In contrast, as measured from the microphones 222*q*, the output of the playback device 102*q* is much further away and does not dominate the measurement to the same degree).

In the above example, the player-to-player may produce multiple measurements for use as input in prediction of a room-average power spectral density. The multiple measurements include a cross channel LR measurement (e.g., output of the playback device 102*q* and the playback device 102*k* as measurement by the microphones 222*p*) and a cross channel RL measurement (e.g., output of the playback device 102*p* and the playback device 102*k* as measurement by the microphones 222*q*). The multiple measurements may also include an LL measurement (e.g., output of the playback device 102*q* and the playback device 102*k* as measurement by the microphones 222*q*) and an RR measurement (e.g., output of the playback device 102*p* and the playback device 102*k* as measurement by the microphones 222*p*). Further details on measurements are described in Appendix A of the specification.

The multiple measurements may be combined to predict a room-average power spectral density using a variety of techniques. For instance, the multiple measurements may be averaged together to predict the room-average power spectral density. In another example, a subset of the multiple measurements (e.g., the cross channel LR and RR measurements) may be averaged to predict the room-average power spectral density. Further example combination techniques are described in Appendix A of the specification.

In further examples, a weighting may be applied to the measurements. For instance, a frequency-dependent weighting may be applied to weigh certain frequency ranges or "bins" such that their portion of the measurement contributes more to the prediction. In an example, at low frequency (e.g., in bass frequencies under the crossover frequency), the multiple measurements are weighed similarly. As the crossover frequency is approached, the self-response channels (e.g., LL and RR) are down weighted over a frequency range to zero (e.g., a range from 60-75 Hz). Further details are described in Appendix A of the specification.

Within examples, the predicted power spectral density may include some errors, such as large dips, that are not present in the actual power spectral density. To mitigate the impact of these errors on the correction filters, some post-processing may be applied to the predicted power spectral density. Such post-processing may limit the dips (and/or peaks) using various techniques. For instance, a maximum dip or peak (as measured in dB) may be set relative to a reference, which, in effect, may limit the amount of boost or cut in a correction filter. In another example, a regularization parameter or scale factor may be applied to limit dips or peaks. Further details on post-processing are described in Appendix A of the specification.

IV. Example Microphone Selection

As discussed above, in example calibration procedures such as self-calibration and player-to-player calibration, microphone-equipped playback devices capture playback via microphones and use the captured output to determine one or more calibration profiles. In some cases, more microphones than needed for calibration of a playback device are present on the playback device or near the playback device. For instance, an example playback device may include an array of multiple microphones (e.g., to facilitate capture of voice input) but only utilize a subset for calibration. In further examples, multiple microphone-equipped playback devices (perhaps each including multiple microphones) are present in an environment and the media playback system 100 could use a subset of these microphones for calibration. In such cases, based on various factors or considerations, a subset of these microphones may be selected for use in calibration.

Figure 10:
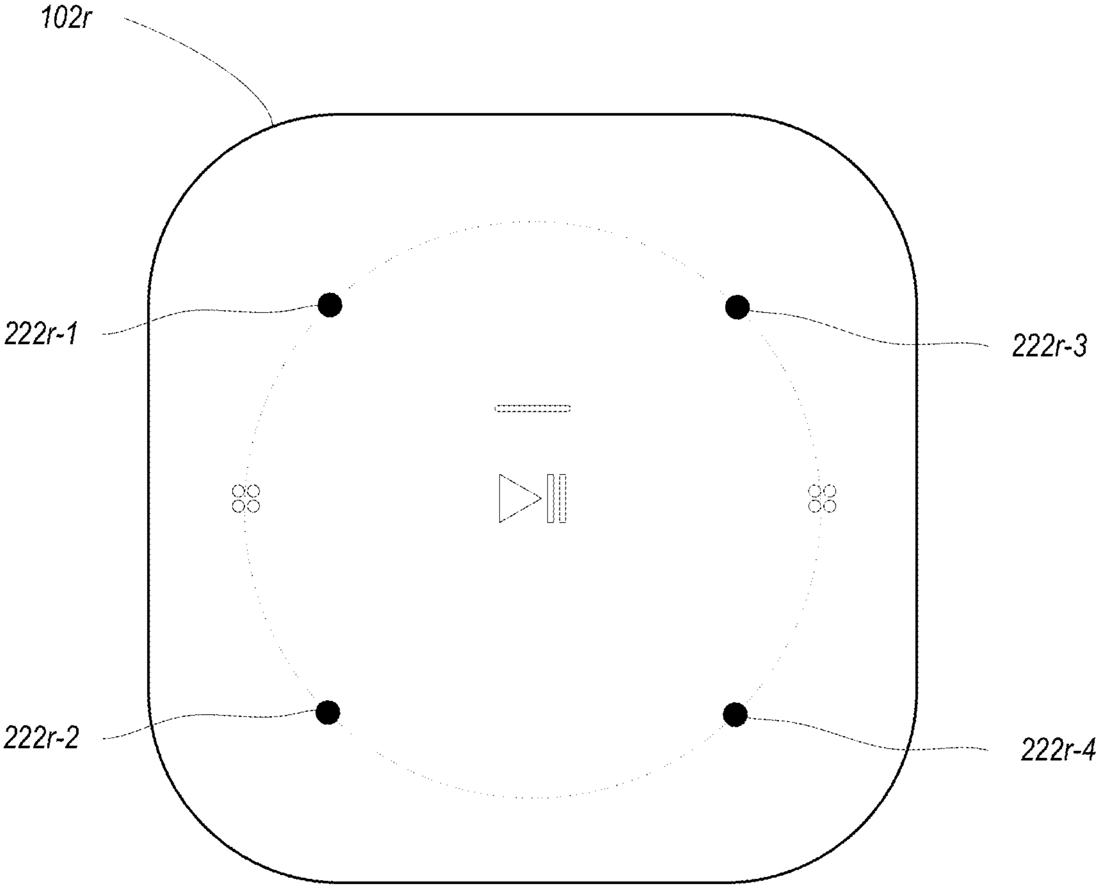
FIG. 10 is a diagram illustrating example microphones of a playback device in accordance with aspects of the disclosed technology.

FIG. 10 illustrates a top-view of a playback device 102*r* that includes multiple microphones, which are collectively referred to the microphones 222*r*. Individually, the microphones 222*r* include a first microphone 222*r*-1, a second microphone 222*r*-2, a third microphone 222*r*-3, and a fourth microphone 222*r*-4. As discussed in the preceding sections, the playback devices 102, such as the playback device 102*r*, may utilize microphones such as the microphones 222*r* for capturing voice inputs and for capturing playback during calibration, among other possible uses.

In examples, the playback device 102*r* may select a first subset of the microphones 222*r* for calibration. For instance, the playback device may select the microphone 222*r*-4 for use in self-calibration and/or player-to-player calibration. Such a selection may leave the remainder of the microphones 222*r* for voice input capture.

Within examples, the playback device 102*r* may select a first subset of the microphones 222*r* based on one or more quality factors. Practically, some variation may exist among the microphones 222*r* based on manufacturing tolerances. Since unexpected acoustic characteristics in a microphone may impact calibration, the playback device 102*r* may attempt to select the microphone(s) 222*r* that are closest to an ideal or known microphone response.

Within examples, the playback device 202*r* may characterize the microphones 222*r* in order to identify the acoustic characteristics of each microphone 222*r*, which may facilitate selection of the most ideal (e.g., closest to the known) microphone among the microphones 222*r*. To characterize the microphones 222*r*, the playback device 202*r* may capture playback of the same or similar audio with each of the microphones 222*r*. The playback device 202*r* may determine respective acoustic responses representing the playback as captured with each microphone 222*r* and then compare the acoustic responses to determine which microphone 222*r* has a microphone response that is most ideal. Within examples, the playback device 202*r* may capture its own playback, or may coordinate with another playback device 102 to capture its playback for microphone characterization.

In some examples, the playback device may select a second subset of the microphones 222*r*. Capture of voice inputs may involve spatial processing (e.g., beamforming) using data from two or more microphones. Different voice assistants (e.g., Amazon® Alexa®, Google®, or Sonos Voice Control®) may use different configurations (e.g., number) of voice input streams (from respective microphones) in their spatial processing algorithms, which, when active, may leave different microphones available for calibration. As noted above, example playback devices 102 may support more than one voice assistant, possibly concurrently.

Some voice assistants use a fixed number of microphones in their spatial processing algorithms. For instance, Amazon® Alexa® uses a fixed number of microphones (4) in a known arrangement relative to one another while Google® also uses a fixed number (2) of microphones, but which are not required to be in a particular known arrangement relative to one another. In such examples, when a voice assistant that requires a fixed number or arrangement of microphones is active, the playback device may select a second subset of the microphones 222*r* to accommodate the microphones needed by the active voice assistant.

Some voice assistants use a variable number of microphones in their spatial processing algorithms. For instance, Sonos Voice Control® implements a multi-channel Weiner filter that uses two or more microphones. Further details regarding spatial processing using a multi-channel Weiner filter are described in, for example, U.S. Pat. No. 10,692,518, titled "Linear Filtering for Noise-Suppressed Speech Detection Via Multiple Network Microphone Devices," which is incorporated by reference in its entirety. In such examples, the playback device 102*r* may select a first subset of the microphones 222*r* for calibration (e.g., the microphone 222*r*-1) and then select a second subset of the microphones 222*r* for voice input (e.g., the microphone 222*r*-2, the microphone 222*r*-2, and the microphone 222*r*-3).

In some implementations, the playback device 102*r* might not use a subset of the microphones 222*r* for calibration at all times. For instance, the playback device 102*r* may use the microphone 222*r*-1 for calibration in certain first time periods (e.g., every 2 minutes) or after a calibration trigger (e.g., when the playback device 102*r* is moved or re-oriented). In such instances, the playback device 102*r* may select a first subset of the microphones 222*r* for calibration (e.g., the microphone 222*r*-1) during the first time periods and, in second time periods, release the first subset for other uses (e.g., voice control).

Further, calibration may be disabled during an interaction with a voice assistant. For instance, after detecting a wake word, the playback device 102*r* may temporarily disable self-calibration and/or player-to-player calibration, as the interaction with a voice assistant may interfere with the calibration procedure. After the interaction completes, the playback device 102*r* may re-enable calibration.

Within examples, one or more of the microphones 222*r* may become damaged, obstructed, or otherwise unsuitable for use in calibration. For instance, a user may accidentally spill liquid on the microphone, which may cause a change in the acoustic response of the microphone. As another example, a user may set another object on the playback device 102*r*, perhaps not realizing that the object obstructs the microphones 222*r*. The playback device 102*r* may determine that one or more of the microphones 222*r* are unsuitable for calibration through a characterization process, which may be performed periodically (e.g., weekly) or at particular times (e.g., before calibration), among other examples. Alternatively, the playback device 102*r* may determine that one or more of the microphones 222*r* are unsuitable for calibration via a calibration procedure, by determining that the samples obtained are characteristic of microphone damage or obstruction.

When one of the microphones 222*r* is unsuitable for calibration, the playback device 102*r* may select another one of the microphones 222*r* for calibration. For instance, if the microphone 222*r*-1 is determined to be unsuitable for calibration, the playback device 102*r* may select the microphone 222*r*-3 (which may be, for instance, the microphone 222*r* closest to a known or ideal microphone response). This would leave the microphone 222*r*-2 and the microphone 222*r*-4 as available for voice input capture, which as discussed above, is sufficient for certain spatial processing algorithms.

In some instances, none of the microphones of a microphone-equipped playback device 102 are suitable for calibration, or none of the microphones are available for calibration. For instance, a user may have activated a switch on the playback device that disables the microphones, which may prevent their use in either calibration or voice capture. In such instances, the microphone-equipped playback device 102 may disable certain calibration procedures such as self-calibration where the playback device 102 captures audio via its microphones as part of the calibration process. Instead, the playback device 102 may coordinate with one or more additional microphone-equipped playback devices 102 for calibration.

Figure 11:
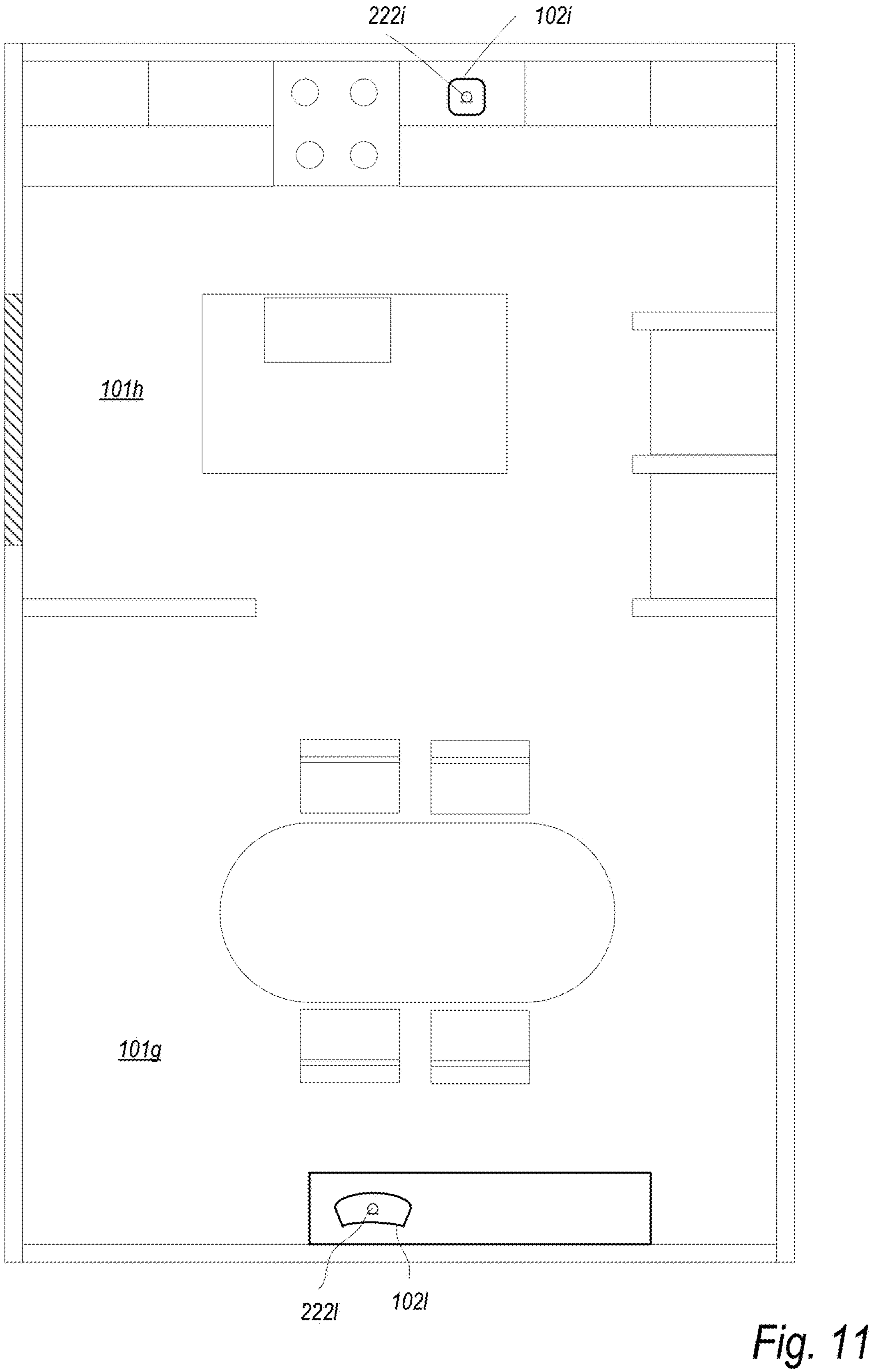
FIG. 11 is a diagram illustrating example calibration techniques in accordance with aspects of the disclosed technology.

To illustrate, FIG. 11 is a diagram illustrating a partial view of the kitchen 101*h* and the dining room 101*g* (FIG. 1A). As shown, the dining room 101*g* includes the playback device 102*l* and the kitchen 101*h* includes the playback device 102*i*. The playback device 102*l* includes microphones 222*l* and the playback device 102*i* includes microphones 222*i*.

In an example, the microphones 222*l* of the playback device 102*l* are determined to be unsuitable for calibration (e.g., after being disabled, damaged, obstructed, or otherwise rendered unsuitable). In such cases, the playback device 102*l* may disable certain calibration procedures such as self-calibration. Instead, the playback device 102*l* may coordinate with one or more additional microphone-equipped playback devices 102 for calibration.

For instance, the playback device 102*l* may coordinate with the playback device 102*i* to perform player-to-player calibration (FIGS. 9A-9D). The playback device 102*l* may identify the playback device 102*i* as being a candidate for player-to-player calibration based on a grouping created between the playback device 102*l* and the playback device 102*i* (e.g., a Dining Room 101*g*+Kitchen 101*h* synchrony group). Other examples are possible as well.

As an example, the playback device 102*l* may identify the playback device 102*i* as being a candidate for player-to-player calibration via a characterization process that identifies microphone-equipped playback devices 102 within audible range of the playback device 102*l*. Such a process may involve the playback device 102*l* playing audio while the other playback devices 102 in the media playback system 100 attempt to capture its playback via their respective microphones 222). Then, playback devices 102 that were able to capture this output suitably for calibration (e.g., with an acceptable signal-to-noise ratio) may be considered as available for player-to-player calibration.

V. Example Audio Playback Device Calibration Techniques

Figure 12:
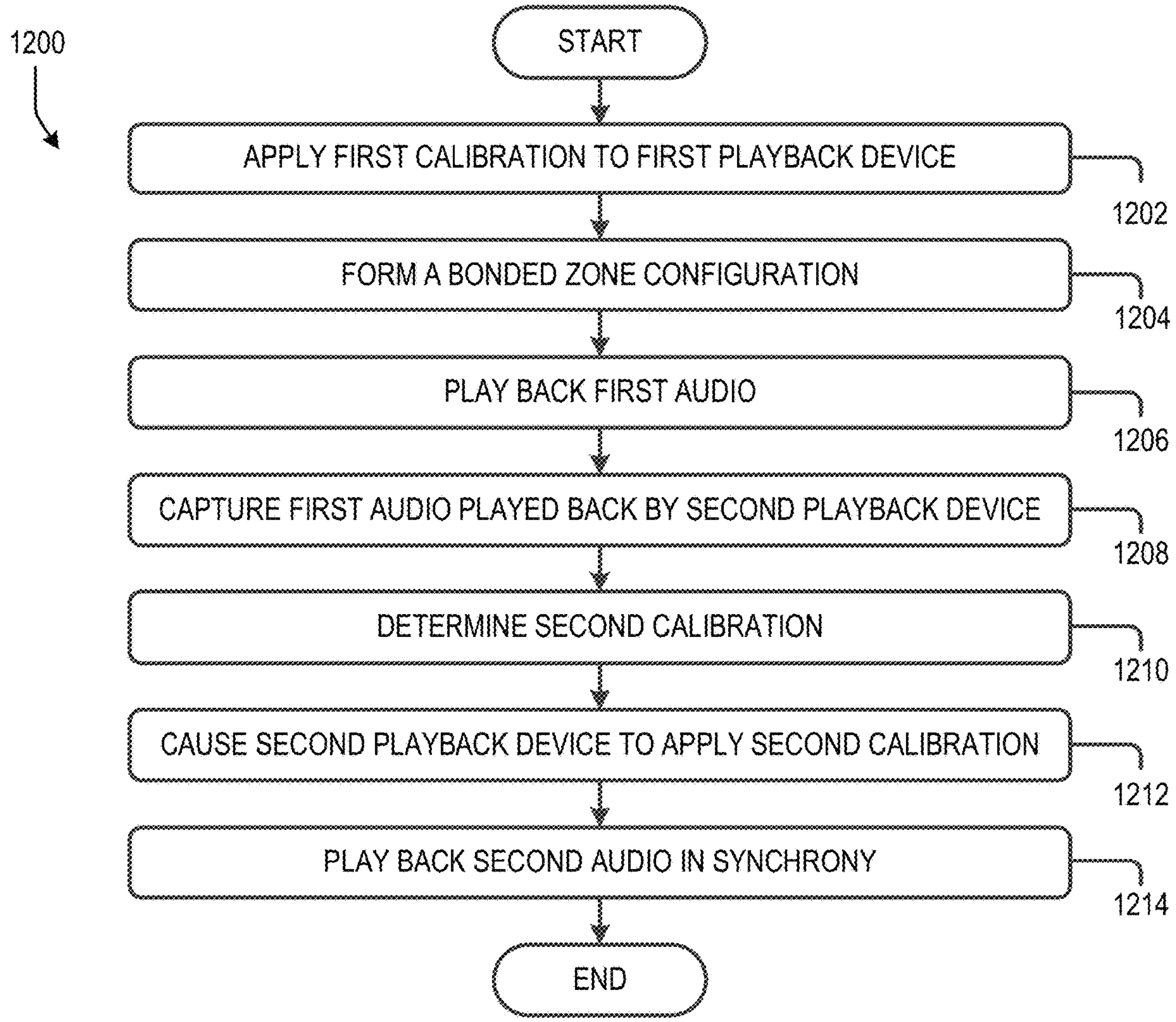
FIG. 12 is a flow diagram of an example method in accordance with aspects of the disclosed technology.

FIG. 12 is a flow diagram showing an example method 1200 to calibrate one or more playback devices. The method

1200 may be performed by a playback device 102, a bonded zone of playback devices 102, or a group of playback devices 102. Alternatively, the method 1200 may be performed by any suitable device or by a system of devices, such as the NMDs 103, control devices 104, computing devices 105, and/or computing devices 106. In examples where the method 1200 involves two playback devices, the method 1200 may be referred to as a player-to-player calibration procedure.

Within examples, the method 1200 may involve at least one playback device 102 including a microphone (i.e., a microphone-equipped playback device 102) and at least one playback device 102 excluding a microphone (i.e., a non-microphone-equipped playback device 102). For the purposes of illustration, the method 1200 is described as being performed by the microphone-equipped playback device 102*a* and the non-microphone-equipped playback device 102*b* in the Den 101*d* (FIG. 9B), but certain examples are described with respect to other example devices, and many variations are contemplated with respect to example devices that are described herein or are otherwise suitable for the example techniques.

At block 1202, the method 1200 includes applying a first calibration. For instance, the playback device 102*a* (FIG. 9B) may apply a first calibration that at least partially offsets acoustic characteristics of an environment surrounding the playback device 102*a* when applied to the first playback device 102*a*. Applying the calibration may involve modifying equalization settings (e.g., for a spectral calibration) and/or propagation delays (e.g., for a spatial calibration) within an audio output pipeline of the playback device 102*a* (e.g., within an audio amplifier or digital signal processor (DSP), such as may be implemented within the audio processing 216 or amplifiers 218 (FIG. 2A). The equalization settings of the calibration may be applied in addition to user-selected equalization settings or other equalization settings applied via other features of the playback devices 102 (e.g., a loudness setting, a speech enhancement setting, or a night mode).

The first calibration may be determined via any suitable calibration procedure, such as the example manual calibration or self-calibration procedures described with respect to FIGS. 7A-8B, among other examples. For instance, the playback device 102*a* may play back audio, capture, via its microphone 222*a*, the audio played back by the playback device 102*a*, and identify a pre-determined calibration that corresponds to a response of the playback device 102*a* as represented by the captured audio, as discussed in the example calibration procedures illustrated in FIG. 8A. As another example, the playback device 102*a* may determine a new calibration based on acoustic characteristics represented in the captured audio.

As another example, the playback device 102*a* may receive data representing the audio as captured by a mobile device (e.g., the control device 104) and determine the first calibration such that the first calibration offsets differences in time of flight from a location of the playback device 102*a* to a location of the mobile device and a location of the playback device 102*b* to the location of the mobile device. The first calibration may also offset differences in time of flight from other playback devices 102, such as the playback device 102*j* and the playback device 102*k* in the Den 101*d*.

At block 1204, the method 1200 includes forming a bonded configuration. For instance, the playback device 102*a* may form a bonded zone configuration with the playback device 102*b* and the playback device 102*j*, and the playback device 102*k* (FIG. 1A, FIG. 9B). The bonded zone configuration may take various forms, such as a stereo pair (FIG. 3B), a home theatre configuration (FIGS. 3C and 3D) or a merged configuration (FIG. 3E). In this example, the playback device 102*a* forms a home theatre configuration with the playback device 102*b* and the playback device 102*j*, and the playback device 102*k* (FIG. 1A, FIG. 9B).

At block 1206, the method 1200 includes playing back first audio. For example, the playback device 102*b* may play back first audio via one or more audio transducers (e.g., the speakers 218 (FIG. 2A). The first audio may take different forms in various examples. In some examples, the first audio may take the form of user-selected content, such as music. Alternatively, the first audio may take the form a specialized calibration sound, such as a calibration sound that includes content across a calibration frequency range. Additional details of calibration sounds that may be output during example calibration procedures are described in, for example, in U.S. Pat. No. 9,736,584, titled "Hybrid Test Tone For Space-Averaged Room Audio Calibration Using a Moving Microphone," which was previously incorporated herein by reference in its entirety.

At block 1208, the method 1200 includes capturing the first audio. For instance, the playback device 102*a* may capture the first audio played back by the playback device 102*b*. Capturing the first audio may involve detecting sound including the first audio via the microphone(s) 222*a* and recording the detected sound to data storage (e.g., the memory 213 (FIG. 2A). Within examples, the playback device 102*a* may capture the first audio may capture the first audio while in the bonded configuration with the playback device 102*b* (and, in this example, the playback device 102*j* and the playback device 102*k*).

Within examples, the playback device 102*a* may include a voice input pipeline for processing voice inputs, and the playback device 102*a* may capture the first audio from the voice input pipeline. For example, the playback device 102*a* may capture the first audio from the voice input pipeline after some initial processing, such as acoustic echo cancelling, has been performed on the captured audio, which may facilitate capture of samples that represent the response of the playback device 102*b* in a particular listening area (i.e., the Den 101*d*).

At block 1210, the method 1200 includes determining a second calibration. For instance, the playback device 102*a* may determine a second calibration that, when applied to the playback device 102*b*, at least partially offsets acoustic characteristics of an environment surrounding the playback device 102*b* (e.g., the Den 101*d*) as represented in the captured first audio. Within examples, determining the second calibration may involve identifying a pre-determined calibration profile (e.g., from a database), perhaps using a response of the playback device 102*b* in the Den 101*d* as represented in the captured first audio as an input to a machine learning algorithm. In other examples, determining the second calibration may involve determining a new calibration profile from a response of the playback device 102*b* in the Den 101*d* as represented in the captured first audio.

At block 1212, the method 1200 includes causing the second playback device to apply the determined second calibration. For example, the playback device 102*a* may send data representing the second calibration and/or instructions to the playback device 102*b* to cause the playback device 102*b* apply the determined second calibration. In further examples, the playback device 102*b* may determine the second calibration and cause itself to apply the second calibration. Within examples, the data may be sent locally (e.g., via the LAN 111) or alternatively, via the cloud (e.g., via one or more of the computing devices 106). Such data may be transferred in a similar manner as described in connection with the example data exchanges between devices of the MPS 100 illustrated in FIG. 6.

Similar to application of the first calibration, applying the second calibration may involve modifying equalization settings within an audio output pipeline of the playback device 102*a* (e.g., within an audio amplifier or digital signal processor (DSP), such as may be implemented within the audio processing 216 or amplifiers 218 (FIG. 2A).

At block 1214, the method 1200 includes playing back second audio in synchrony. For instance, the playback device 102*a* may play back one or more first channels of second audio in synchrony with the playback device 102*b*. The playback device 102*b* may likewise play back one or more second channels of the second audio in synchrony with the playback device 102*a*. As, in this example, the Den 101*d* includes the playback device includes the playback device 102*j* and the playback device 102*k*, the playback device 102*j* and the playback device 102*k* may likewise play back portions of the second audio (e.g., one or more third channels, and/or bass portions) in synchrony with the playback device 102*a* and the playback device 102*b*.

Within examples, the first and second channels of the second audio may correspond to various multi-channel audio content, such as stereo or surround sound audio content. For instance, the playback device 102*b* may play back one or more front signals of surround sound audio content (e.g., the center, left, and/or right channels) while the playback device 102*a* plays back one or more surround channels of the audio content. In further examples, the second audio includes object-based audio comprising metadata representing multiple objects and playing back the second audio in synchrony involves playing back one or more first channels of second audio in synchrony with playback of one or more second channels of the second audio by the second playback device to render at least one object in the object-based audio.

In further examples, the method 1200 may also involve calibrating additional playback devices, such as the playback device 102*j* and/or the playback device 102*k*, among other examples, For instance, the playback device 102*a* may capture third audio played back by the playback device 102*k* and determine a third calibration that at least partially offsets acoustic characteristics of an environment surrounding the playback device 102*k* as represented in the captured third audio when applied to the playback device 102*k*. The playback device 102*a* may cause the third playback device to apply the third calibration (e.g., while playing back audio in synchrony with the playback device 102*a* and the playback device 102*b*.

In additional examples, an additional playback device may facilitate calibration. For instance, the playback device 102*j* may include a microphone (e.g., the microphone(s) 222*j*, as shown in FIG. 9B), and may capture, via the microphone, the first audio played back by the playback device 102*b*. The playback device 102*j* may send, via a network interface, data representing the captured first audio to the playback device 102*a*, which may determine the second calibration based on the first audio captured by the first playback device and the first audio captured by the third playback device.

In further example, the method 1200 may involve additional aspects of the example calibration procedures and other features described herein. For instance, the method 1200 may include a manual spatial calibration or a manual spectral calibration. Such a calibration may supersede a self- or player-to-player calibration procedure.

In some examples, the method 1200 may involve detecting that an applied calibration is no longer valid (or presumed invalid), and triggering another calibration. For instance, the media playback system 100 may detect that a calibration applied on the playback device 102*b* is invalid and trigger re-calibration using steps of the method 1200 described above. Detecting that the calibration is invalid may involve detecting that the playback device 102*b* has been moved or re-positioned, that a certain period of time since calibration has elapsed, that the acoustic characteristics of the listening area (i.e., the Den 101*d*) have been altered beyond a threshold, as well as other suitable triggers.

VI. Example Microphone Selection Techniques

Figure 13:
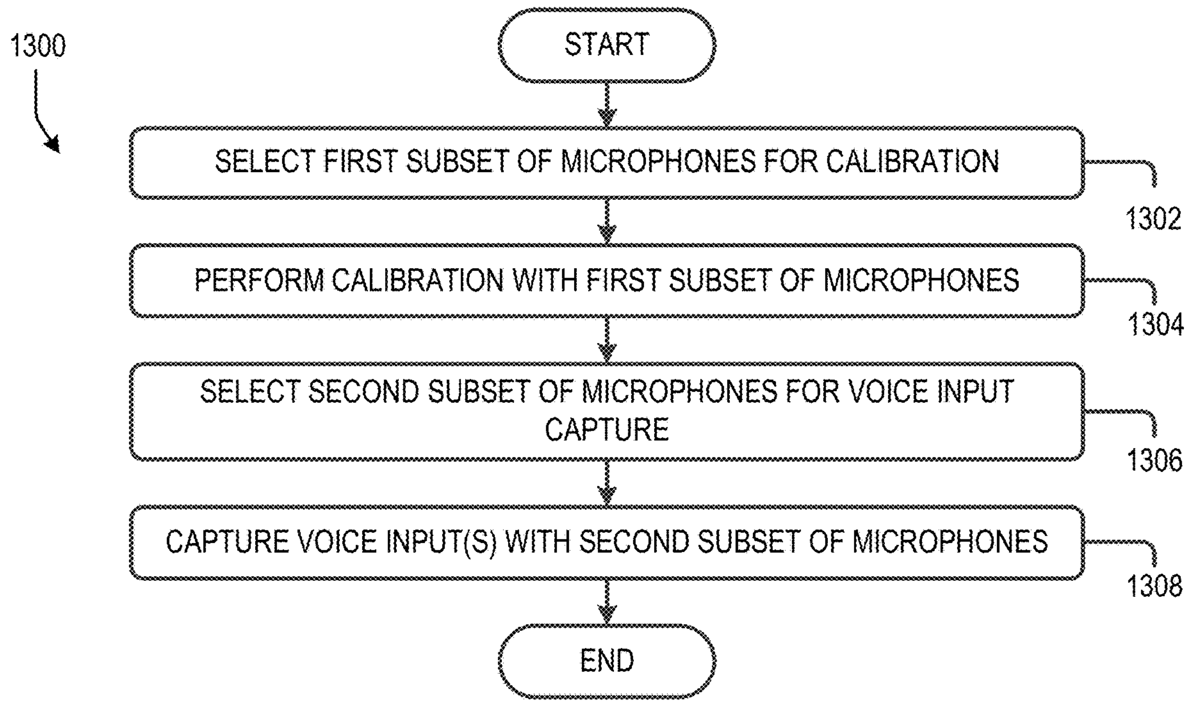
FIG. 13 is a flow diagram of an example method in accordance with aspects of the disclosed technology.

FIG. 13 is a flow diagram showing an example method 1300 to select microphones for calibration of a playback device. The method 1300 may be performed by a playback device 102, a bonded zone of playback devices 102, or a group of playback devices 102. Alternatively, the method 1300 may be performed by any suitable device or by a system of devices, such as the NMDs 103, control devices 104, computing devices 105, and/or computing devices 106. For the purposes of illustration, the method 1300 is described as being performed by the playback device 102*r* and/or the playback device 102*l*.

At block 1302, the method 1300 includes selecting a first subset of microphones for calibration. For example, the playback device 102*r* may select a first subset of the microphones 222*r* (FIG. 10), which may include, for example, the microphone 222*r*-1. The playback device 102*r* may select the microphones 222*r* based on suitability for calibration, which may be measured based on the microphone's acoustic characteristics (i.e., how close the microphone's acoustic characteristics match an ideal or known acoustic response). Examples of microphone selection are discussed in connection with FIG. 10.

In some examples, selection of the first subset of microphones involves selecting microphones on another playback device. For instance, the playback device 102*l* may select the microphones 222*i* of the playback device 102*i*, as discussed in connection with FIG. 11. In some cases, the playback device 102*i* may select microphones 222 on a different playback device when suitable microphones on the playback device 102*i* are not suitable or available, such as when its microphone(s) 2221 are disabled, obstructed, damaged or otherwise unsuitable. In further cases, the playback device 102*i* may select microphones 222 on a different playback device when such microphones would provide a higher quality measurement (e.g., due to microphone quality, or relative positioning of the playback devices 102). Yet further, a playback device 102 may select microphones 222 on another playback device for calibration when the playback device 102 is not equipped with microphones.

At block 1304, the method 1300 includes performing a calibration with the first subset of microphones. For instance, the playback device 102*r* may perform a self-calibration (FIG. 8A) or hybrid calibration (FIG. 8B) using the first subset of microphones 222. In another example, the playback device 102*l* and the playback device 102*i* (FIG. 11) may perform a player-to-player calibration, as discussed in connection with FIGS. 9A-9D.

At block 1302, the method 1300 includes selecting a second subset of microphones for calibration. For example, the playback device 102*r* may select a second subset of the microphones 222*r* (FIG. 10), which may include for example, the microphone 222*r*-2, the microphone 222*r*-3, and/or the microphone 222*r*-4. The playback device 102*r* may select the microphones 222*r* based on which voice assistant(s) are active, and further what input streams are required for the corresponding spatial processing algorithm. Further examples are discussed in connection with FIG. 10.

At block 1308, the method 1300 includes capturing voice inputs with the second subset of microphones. For instance, the playback device 102*r* may capture one or more voice inputs via the microphone 222*r*-2, the microphone 222*r*-3, and/or the microphone 222*r*-4. Capturing a voice input may involve processing microphone input data streams with a spatial processor (e.g., a beamformer).

After initial processing, the playback device 102*r* may send the captured voice inputs to a voice assistant for processing. Example voice assistants may be cloud-based (e.g., Google® or Amazon® Alexa®) or local (e.g., Sonos Voice Assistant®). In some examples, more than one voice assistant is active on the playback device 102*r* and the playback device 102*r* may select an appropriate voice assistant for each voice input.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method to be performed by a media playback system comprising a first playback device and a second playback device, the first playback device comprising a microphone and the second playback device excluding a microphone, and the method comprising: applying a first calibration that at least partially offsets acoustic characteristics of an environment surrounding the first playback device when applied to the first playback device; forming a bonded configuration with the second playback device, while in the bonded configuration, playing back first audio, capturing, via the microphone, the first audio played back by the second playback device; determining a second calibration that at least partially offsets acoustic characteristics of an environment surrounding the second playback device as represented in the captured first audio when applied to the second playback device; causing, via the first network interface, the second playback device to apply the determined second calibration, while the first calibration is applied to the first playback device, the second calibration is applied to the second playback device, and the first playback device is in the bonded configuration with the second playback device, play back one or more first channels of second audio in synchrony with playback of one or more second channels of the second audio by the second playback device, and while the first calibration is applied to the first playback device, the second calibration is applied to the second playback device, and the second playback device is in the bonded configuration with the first playback device, play back the one or more second channels of the second audio in synchrony with playback of one or more first channels of the second audio by the first playback device.

Example 2: The method of Example 1, further comprising: playing back additional audio; capturing, via the microphone, the additional audio played back by the first playback device; and determining the first calibration, wherein the determined first calibration at least partially offsets the acoustic characteristics of the environment surrounding the first playback device as represented by the captured additional audio when applied to the first playback device.

Example 3: The method of any of Example 2, further comprising: receiving, via the first network interface from a mobile device, data representing the additional audio as captured by the mobile device, wherein determining the first calibration comprises determining the first calibration such that the first calibration offsets differences in time of flight from (i) a location of the first playback device to a location of the mobile device and (ii) a location of the second playback device to the location of the mobile device.

Example 4: The method of any of Examples 1-3, wherein the first playback device comprises a soundbar-type playback device configured to play one or more front signals of audio content while in the bonded configuration, and wherein the second playback device is configured to play one or more surround signals of the audio content while in the bonded configuration.

Example 5: The method of Example 4, wherein the media playback system further comprises a third playback device that excludes a microphone, wherein the bonded configuration includes the third playback device, wherein the third playback device is configured to play one or more additional surround signals of the audio content while in the bonded configuration, and wherein the method further comprises: capturing, via the microphone, third audio played back by the third playback device, determining a third calibration that at least partially offsets acoustic characteristics of an environment surrounding the third playback device as represented in the captured third audio when applied to the third playback device; causing, via the first network interface, the third playback device to apply the determined third calibration; and while the first calibration is applied to the first playback device, the second calibration is applied to the second playback device, and the third calibration is applied to the third playback device, play back one or more third channels of the second audio in synchrony with playback of one or more first channels of the second audio by the first playback device.

Example 6: The method of Example 4, wherein the second playback device comprises one or more first transducers and one or more second transducers, and wherein the one or more surround signals of the audio content comprise a left surround signal and an overhead surround signal.

Example 7: The method of any of Examples 1-6, wherein the second playback device comprises a soundbar-type playback device configured to play one or more front signals of audio content while in the bonded configuration, and wherein the first playback device is configured to play one or more surround signals of the audio content while in the bonded configuration.

Example 8: The method of Example 7, wherein the media playback system further comprises a third playback device comprising an additional microphone, wherein the bonded configuration includes the third playback device, wherein the third playback device is configured to play one or more additional surround signals of the audio content while in the bonded configuration, and wherein the method further comprises: capturing, via the additional microphone, the first audio played back by the second playback device; and sending, via the third network interface, data representing the captured first audio, wherein determining the second calibration comprises determining the second calibration based on the first audio captured by the first playback device and the first audio captured by the third playback device.

Example 9: The method of any of Examples 1-8: wherein the bonded configuration comprises a stereo pair configuration, and wherein the first playback device is configured to play a first signal of stereo audio content while in the stereo pair configuration, and wherein the second playback device is configured to pay a second signal of the stereo audio content while in the stereo pair configuration.

Example 10: The method of any of Examples 1-9, wherein the second audio comprises object-based audio comprising metadata representing multiple objects, and wherein playing back one or more first channels of second audio in synchrony with playback of one or more second channels of the second audio by the second playback device comprises playing back one or more first channels of second audio in synchrony with playback of one or more second channels of the second audio by the second playback device to render at least one object in the object-based audio.

Example 11: The method of any of Examples 9-10, wherein the one or more cloud services comprise a smart home cloud service, and wherein configuring the playback device with the respective user accounts of the one or more cloud services comprises: populating the local natural language unit library of the local voice input pipeline with keywords corresponding to at least one of (i) device names of smart devices registered with a particular user account of the smart home cloud service and (ii) commands to control the smart devices registered with a particular user account of the smart home cloud service.

Example 13: A tangible, non-transitory, computer-readable medium having instructions stored thereon that are executable by one or more processors to cause a media playback system to perform the method of any one of Examples 1-10.

Example 14: A media playback system comprising a first playback device and a second playback device, the media playback system configured to perform the method of any one of Examples 1-10.

Example 15: A playback device comprising at least one speaker, a network interface, a microphone, one or more processors, and a data storage having instructions stored thereon that are executable by the one or more processors to cause the playback device to perform the method of any of Examples 1-10.

Example 16: A method comprising: selecting a first subset of microphones for calibration; performing a calibration with the first subset of microphones; selecting a second subset of microphones, and capturing one or more voice inputs with second subset of microphones.

Example 17: The method of Example 17, wherein selecting the first subset of microphones comprises a particular playback device selecting at least one microphone on the particular playback device.

Example 18: The method of Example 17, wherein performing a calibration with the first subset of microphones comprises the particular playback device performing a self-calibration using the first subset of microphones.

Example 19: The method of any of Examples 16-19, wherein selecting the first subset of microphones comprises a first playback device selecting at least one microphone on a second playback device.

Example 20: The method of Example 19, wherein performing a calibration with the first subset of microphones comprises the first playback device performing a player-to-player calibration with the second playback device.

Example 21: The method of any of Examples 16-20, wherein selecting the first subset of microphones comprises characterizing multiple microphones to determine respective quality metrics, and selecting the first subset from among the multiple microphones based on the respective quality metrics.

Example 22: The method of any of Examples 16-21, wherein selecting the second subset of microphones comprises determining that an active voice assistant utilizes a particular configuration of microphones, and selecting the second subset to satisfy the particular configuration.

Example 23: The method of any of Examples 16-22, wherein selecting the second subset of microphones comprises determining that an active voice assistant utilizes a variable configuration of microphones, and selecting the second subset based on available microphones.

Example 24: A tangible, non-transitory, computer-readable medium having instructions stored thereon that are executable by one or more processors to cause a media playback system to perform the method of any one of Examples 16-23.

Example 25: A media playback system comprising a first playback device and a second playback device, the media playback system configured to perform the method of any one of Examples 16-23.

Example 26: A playback device comprising at least one speaker, a network interface, a microphone, one or more processors, and a data storage having instructions stored thereon that are executable by the one or more processors to cause the playback device to perform the method of any of Examples 16-23.

We claim:

1. A media playback system comprising a first playback device and a second playback device, the first playback device comprising:

a microphone;

a first network interface;

at least one first processor; and a first housing carrying the microphone, the first network interface, the at least one first processor, and first data storage including first instructions that are executable by the at least one first processor such that the first playback device is configured to:

apply a first calibration that at least partially offsets acoustic characteristics of an environment surrounding the first playback device when applied to the first playback device;

form a bonded configuration with the second playback device;

while in the bonded configuration, capture, via the microphone, first audio played back by the second playback device;

determine a second calibration that at least partially offsets acoustic characteristics of an environment surrounding the second playback device as represented in the captured first audio when applied to the second playback device;

cause, via the first network interface, the second playback device to apply the determined second calibration; and while the first calibration is applied to the first playback device, the second calibration is applied to the second playback device, and the first playback device is in the bonded configuration with the second playback device, play back one or more first channels of second audio in synchrony with playback of one or more second channels of the second audio by the second playback device, wherein the second playback device excludes a microphone and comprises:

a second network interface;

at least one second processor; and a second housing carrying the second network interface, the at least one second processor, and second data storage including second instructions that are executable by the at least one second processor such that the second playback device is configured to:

play back the first audio; and while the first calibration is applied to the first playback device, the second calibration is applied to the second playback device, and the second playback device is in the bonded configuration with the first playback device, play back the one or more second channels of the second audio in synchrony with playback of one or more first channels of the second audio by the first playback device.

2. The media playback system of claim 1, wherein the first playback device further comprises first instructions that are executable by the at least one first processor such that the first playback device is configured to:

play back additional audio;

capture, via the microphone, the additional audio played back by the first playback device; and determine the first calibration, wherein the determined first calibration at least partially offsets the acoustic characteristics of the environment surrounding the first playback device as represented by the captured additional audio when applied to the first playback device.

3. The media playback system of claim 2, wherein the first playback device further comprises first instructions that are executable by the at least one first processor such that the first playback device is configured to:

receive, via the first network interface from a mobile device, data representing the additional audio as captured by the mobile device, wherein the first instructions that are executable by the at least one first processor such that the first playback device is configured to determine the first calibration comprise first instructions that are executable by the at least one first processor such that the first playback device is configured to:

determine the first calibration such that the first calibration offsets differences in time of flight from (i) a location of the first playback device to a location of the mobile device and (ii) a location of the second playback device to the location of the mobile device.

4. The media playback system of claim 1, wherein the first playback device comprises a soundbar-type playback device configured to play one or more front signals of audio content while in the bonded configuration, and wherein the second playback device is configured to play one or more surround signals of the audio content while in the bonded configuration.

5. The media playback system of claim 4, further comprising a third playback device, wherein the bonded configuration includes the third playback device, wherein the third playback device is configured to play one or more additional surround signals of the audio content while in the bonded configuration, and wherein the first playback device further comprises first instructions that are executable by the at least one first processor such that the first playback device is configured to:

capture, via the microphone, third audio played back by the third playback device;

determine a third calibration that at least partially offsets acoustic characteristics of an environment surrounding the third playback device as represented in the captured third audio when applied to the third playback device; and cause, via the first network interface, the third playback device to apply the determined third calibration, and wherein the third playback device excludes a microphone and comprises:

a third network interface;

at least one third processor; and a third housing carrying the third network interface, the at least one third processor, and third data storage including third instructions that are executable by the at least one third processor such that the third playback device is configured to:

while the first calibration is applied to the first playback device, the second calibration is applied to the second playback device, and the third calibration is applied to the third playback device, play back one or more third channels of the second audio in synchrony with playback of one or more first channels of the second audio by the first playback device.

6. The media playback system of claim 4, wherein the second playback device comprises one or more first transducers and one or more second transducers, and wherein the one or more surround signals of the audio content comprise a left surround signal and an overhead surround signal.

7. The media playback system of claim 1, wherein the second playback device comprises a soundbar-type playback device configured to play one or more front signals of audio content while in the bonded configuration, and wherein the first playback device is configured to play one or more surround signals of the audio content while in the bonded configuration.

8. The media playback system of claim 7, further comprising a third playback device, wherein the bonded configuration includes the third playback device, wherein the third playback device is configured to play one or more additional surround signals of the audio content while in the bonded configuration, and wherein the third playback device comprises:

an additional microphone;

a third network interface;

at least one third processor; and a third housing carrying the third network interface, the at least one third processor, and third data storage including third instructions that are executable by the at least one third processor such that the third playback device is configured to:

capture, via the additional microphone, the first audio played back by the second playback device; and send, via the third network interface, data representing the captured first audio, wherein the first instructions that are executable by the at least one first processor such that the first playback device is configured to determine the second calibration comprise first instructions that are executable by the at least one first processor such that the first playback device is configured to:

determine the second calibration based on the first audio captured by the first playback device and the first audio captured by the third playback device.

9. The media playback system of claim 1, wherein the bonded configuration comprises a stereo pair configuration, and wherein the first playback device is configured to play a first signal of stereo audio content while in the stereo pair configuration, and wherein the second playback device is configured to pay a second signal of the stereo audio content while in the stereo pair configuration.

10. The media playback system of claim 1, wherein the second audio comprises object-based audio comprising metadata representing multiple objects, and wherein the first instructions that are executable by the at least one first processor such that the first playback device is configured to play back one or more first channels of second audio in synchrony with playback of one or more second channels of the second audio by the second playback device comprise first instructions that are executable by the at least one first processor such that the first playback device is configured to:

play back one or more first channels of second audio in synchrony with playback of one or more second channels of the second audio by the second playback device to render at least one object in the object-based audio.

11. A first playback device comprising:

a microphone;

a network interface;

at least one processor; and a housing carrying the microphone, the network interface, the at least one processor, and first data storage including instructions that are executable by the at least one processor such that the first playback device is configured to:

apply a first calibration that at least partially offsets acoustic characteristics of an environment surrounding the first playback device when applied to the first playback device;

form a bonded configuration with a second playback device that excludes a microphone;

while in the bonded configuration, capture, via the microphone, first audio played back by the second playback device;

determine a second calibration that at least partially offsets acoustic characteristics of an environment surrounding the second playback device as represented in the captured first audio when applied to the second playback device;

cause, via the network interface, the second playback device to apply the determined second calibration; and while the first calibration is applied to the first playback device, the second calibration is applied to the second playback device, and the first playback device is in the bonded configuration with the second playback device, play back one or more first channels of second audio in synchrony with playback of one or more second channels of the second audio by the second playback device.

12. The first playback device of claim 11, wherein the first playback device further comprises instructions that are executable by the at least one processor such that the first playback device is configured to:

play back additional audio;

capture, via the microphone, the additional audio played back by the first playback device; and determine the first calibration, wherein the determined first calibration at least partially offsets the acoustic characteristics of the environment surrounding the first playback device as represented by the captured additional audio when applied to the first playback device.

13. The first playback device of claim 12, wherein the first playback device further comprises instructions that are executable by the at least one processor such that the first playback device is configured to:

receive, via the network interface from a mobile device, data representing the additional audio as captured by the mobile device, wherein the instructions that are executable by the at least one processor such that the first playback device is configured to determine the first calibration comprise instructions that are executable by the at least one processor such that the first playback device is configured to:

determine the first calibration such that the first calibration offsets differences in time of flight from (i) a location of the first playback device to a location of the mobile device and (ii) a location of the second playback device to the location of the mobile device.

14. The first playback device of claim 11, wherein the first playback device comprises a soundbar-type playback device configured to play one or more front signals of audio content while in the bonded configuration, and wherein the second playback device is configured to play one or more surround signals of the audio content while in the bonded configuration.

15. The first playback device of claim 11, wherein the bonded configuration comprises a stereo pair configuration, and wherein the first playback device is configured to play a first signal of stereo audio content while in the stereo pair configuration, and wherein the second playback device is configured to pay a second signal of the stereo audio content while in the stereo pair configuration.

16. The first playback device of claim 11, wherein the second audio comprises object-based audio comprising metadata representing multiple objects, and wherein the instructions that are executable by the at least one processor such that the first playback device is configured to play back one or more first channels of second audio in synchrony with playback of one or more second channels of the second audio by the second playback device comprise instructions that are executable by the at least one processor such that the first playback device is configured to:

play back one or more first channels of second audio in synchrony with playback of one or more second channels of the second audio by the second playback device to render at least one object in the object-based audio.

17. A method to be performed by a system comprising a first playback device and a second playback device, the method comprising:

the first playback device applying a first calibration that at least partially offsets acoustic characteristics of an environment surrounding the first playback device when applied to the first playback device;

the first playback device forming a bonded configuration with the second playback device;

the second playback device playing back first audio;

while in the bonded configuration, the first playback device capturing, via a microphone, the first audio played back by the second playback device, wherein the second playback device excludes a microphone;

the first playback device determining a second calibration that at least partially offsets acoustic characteristics of an environment surrounding the second playback device as represented in the captured first audio when applied to the second playback device;

the first playback device causing, via a network interface, the second playback device to apply the determined second calibration;

while the first calibration is applied to the first playback device, the second calibration is applied to the second playback device, and the first playback device is in the bonded configuration with the second playback device, the first playback device playing back one or more first channels of second audio in synchrony with playback of one or more second channels of the second audio by the second playback device; and while the first calibration is applied to the first playback device, the second calibration is applied to the second playback device, and the second playback device is in the bonded configuration with the first playback device, the second playback device playing back the one or more second channels of the second audio in synchrony with playback of one or more first channels of the second audio by the first playback device.

18. The method of claim 17, further comprising:

the first playback device playing back additional audio;

the first playback device capturing, via the microphone, the additional audio played back by the first playback device; and the first playback device determining the first calibration, wherein the determined first calibration at least partially offsets the acoustic characteristics of the environment surrounding the first playback device as represented by the captured additional audio when applied to the first playback device.

19. The method of claim 17, wherein the first playback device comprises a soundbar-type playback device configured to play one or more front signals of audio content while in the bonded configuration, wherein the second playback device is configured to play one or more surround signals of the audio content while in the bonded configuration, and wherein the system further comprises a third playback device, wherein the third playback device is configured to play one or more additional surround signals of the audio content while in the bonded configuration, and wherein the method further comprises:

the first playback device capturing, via the microphone, third audio played back by the third playback device, wherein the third playback device excludes a microphone;

the first playback device determining a third calibration that at least partially offsets acoustic characteristics of an environment surrounding the third playback device as represented in the captured third audio when applied to the third playback device; and the first playback device causing, via the network interface, the third playback device to apply the determined third calibration, and wherein the third playback device excludes a microphone and comprises:

a third network interface;

at least one third processor; and a third housing carrying the third network interface, the at least one third processor, and third data storage including third instructions that are executable by the at least one third processor such that the third playback device is configured to:

while the first calibration is applied to the first playback device, the second calibration is applied to the second playback device, and the third calibration is applied to the third playback device, play back one or more third channels of the second audio in synchrony with playback of one or more first channels of the second audio by the first playback device.

20. The method of claim 17, wherein the second playback device comprises a soundbar-type playback device configured to play one or more front signals of audio content while in the bonded configuration, wherein the first playback device is configured to play one or more surround signals of the audio content while in the bonded configuration, wherein the system further comprises a third playback device, wherein the third playback device is configured to play one or more additional surround signals of the audio content while in the bonded configuration, and wherein the method further comprises:

the third playback device capturing, via an additional microphone, the first audio played back by the second playback device; and the third playback device sending, via an additional network interface, data representing the captured first audio, wherein determining the second calibration comprises:

determining the second calibration based on the first audio captured by the first playback device and the first audio captured by the third playback device.

* * * * *